(12) United States Patent
George et al.

(10) Patent No.: US 12,573,309 B2
(45) Date of Patent: Mar. 10, 2026

(54) SYSTEM AND/OR METHOD FOR PILOT ATTENTION MONITORING

(71) Applicant: Merlin Labs, Inc., Boston, MA (US)

(72) Inventors: Matthew George, Boston, MA (US); Alexander Naiman, Boston, MA (US); Joseph Bondaryk, Boston, MA (US); Cynthia Comer, Boston, MA (US)

(73) Assignee: Merlin Labs, Inc., Boston, MA (US)

( * ) Notice: Subject to any disclaimer, the term of this patent is extended or adjusted under 35 U.S.C. 154(b) by 96 days.

(21) Appl. No.: 18/379,095

(22) Filed: Oct. 11, 2023

(65) Prior Publication Data

US 2024/0119848 A1 Apr. 11, 2024

Related U.S. Application Data

(60) Provisional application No. 63/420,262, filed on Oct. 28, 2022, provisional application No. 63/415,017, filed on Oct. 11, 2022.

(51) Int. Cl.
*G08G 5/55* (2025.01)
*G06F 40/40* (2020.01)
(Continued)

(52) U.S. Cl.
CPC .............. *G08G 5/55* (2025.01); *G06F 40/40* (2020.01); *G06V 10/82* (2022.01); *G06V 20/59* (2022.01);
(Continued)

(58) Field of Classification Search
CPC .. G08G 5/55; G08G 5/26; G08G 5/57; G08G 5/58; G06F 40/40; G06V 10/82; G06V 20/59; G06V 40/10
(Continued)

(56) References Cited

U.S. PATENT DOCUMENTS 6,160,497 A 12/2000 Clark
6,317,659 B1 11/2001 Lindsley et al.
(Continued)

FOREIGN PATENT DOCUMENTS

EP 2665013 A1 11/2013
WO 2013187874 A1 12/2013
WO 2014106273 A1 7/2014

OTHER PUBLICATIONS

Casado, Rafael , et al., "Neural Network-Based Aircraft Conflict Prediction in Final Approach Maneuvers", Electronics 2020, 9, 1708, www.mdpi.com/journal/electronics.
(Continued)

*Primary Examiner* — Isaac G Smith
(74) *Attorney, Agent, or Firm* — Jeffrey Schox; Diana Lin

(57) ABSTRACT

The method S100 can include: generating pilot monitoring data S110; determining a pilot attention state based on the sensor data S120; optionally determining an aircraft state S130; responding to an event based on the pilot attention state S140; and can optionally include controlling the aircraft based on the aircraft state and the pilot attention state S150. However, the method S100 can additionally or alternatively include any other suitable set of elements. The method functions to facilitate human-in-the-loop aircraft control by an attentive pilot-in-command (PIC). Additionally or alternatively, the method can function to identify and/or resolve pilot inattentiveness (e.g., based on the context of the aircraft state).

21 Claims, 17 Drawing Sheets

(51) Int. Cl.

| | |
|---|---|
| *G06V 10/82* | (2022.01) |
| *G06V 20/59* | (2022.01) |
| *G06V 40/10* | (2022.01) |
| *G08G 5/26* | (2025.01) |
| *G08G 5/57* | (2025.01) |
| *G08G 5/58* | (2025.01) |

(52) U.S. Cl.
CPC .............. *G06V 40/10* (2022.01); *G08G 5/26* (2025.01); *G08G 5/57* (2025.01); *G08G 5/58* (2025.01)

(58) Field of Classification Search
USPC ............................................................. 701/3
See application file for complete search history.

(56) References Cited

U.S. PATENT DOCUMENTS

| | | | |
|---|---|---|---|
| 6,405,132 B1 | 6/2002 | Breed et al. | |
| 6,542,796 B1 | 4/2003 | Gibbs et al. | |
| 6,552,669 B2 | 4/2003 | Simon et al. | |
| 6,700,482 B2 | 3/2004 | Ververs et al. | |
| 6,828,921 B2 | 12/2004 | Brown et al. | |
| 6,922,631 B1 | 7/2005 | Dwyer et al. | |
| 6,926,233 B1 | 8/2005 | Corcoran | |
| 6,965,816 B2 | 11/2005 | Walker | |
| 7,103,455 B2 | 9/2006 | Subelet | |
| 7,113,852 B2 | 9/2006 | Kapadia et al. | |
| 7,177,731 B2 | 2/2007 | Sandell et al. | |
| 7,363,119 B2 | 4/2008 | Griffin et al. | |
| 7,415,326 B2 | 8/2008 | Komer et al. | |
| 7,650,232 B1 | 1/2010 | Paielli | |
| 7,876,238 B2 | 1/2011 | Vandenbergh et al. | |
| 7,912,592 B2 | 3/2011 | Komer et al. | |
| 8,019,489 B2 | 9/2011 | Harrison et al. | |
| 8,149,141 B2 | 4/2012 | Coulmeau et al. | |
| 8,164,487 B1 | 4/2012 | Tsai | |
| 8,285,427 B2 | 10/2012 | Rogers et al. | |
| 8,417,396 B2 | 4/2013 | Goodman et al. | |
| 8,423,272 B2 | 4/2013 | Judd et al. | |
| 8,639,401 B2 | 1/2014 | Bailey et al. | |
| 8,666,748 B2 | 3/2014 | Dong et al. | |
| 8,892,349 B2 | 11/2014 | Estkowski et al. | |
| 9,171,472 B2 | 10/2015 | Scheu et al. | |
| 9,330,573 B2 | 5/2016 | Brandao et al. | |
| 9,443,433 B1 | 9/2016 | Conway et al. | |
| 9,592,921 B2 | 3/2017 | Paul Dominic et al. | |
| 9,598,180 B1 | 3/2017 | Browder | |
| 9,697,737 B2 | 7/2017 | Hale et al. | |
| 9,881,504 B2 | 1/2018 | Dominic et al. | |
| 9,919,712 B1* | 3/2018 | Doyen .............. A61B 5/14542 |
| 10,656,643 B1 | 5/2020 | Bertram et al. | |
| 10,935,938 B1 | 3/2021 | Bertram et al. | |
| 11,435,762 B1 | 9/2022 | Auerbach et al. | |
| 2003/0093187 A1 | 5/2003 | Walker | |
| 2003/0191568 A1 | 10/2003 | Breed | |
| 2003/0193408 A1 | 10/2003 | Brown et al. | |
| 2004/0122567 A1 | 6/2004 | Gaier | |
| 2005/0046584 A1 | 3/2005 | Breed | |
| 2005/0049762 A1 | 3/2005 | Dwyer | |
| 2005/0065682 A1 | 3/2005 | Kapadia et al. | |
| 2005/0187677 A1 | 8/2005 | Walker | |
| 2005/0201212 A1* | 9/2005 | Greenstein ............ G06F 1/1647 |
| | | | 369/24.01 |
| 2005/0203675 A1 | 9/2005 | Griffin et al. | |
| 2005/0203676 A1 | 9/2005 | Sandell et al. | |
| 2006/0026017 A1 | 2/2006 | Walker | |
| 2007/0050101 A1 | 3/2007 | Sacle et al. | |
| 2007/0219678 A1 | 9/2007 | Coulmeau | |
| 2007/0288128 A1 | 12/2007 | Komer et al. | |

| | | | |
|---|---|---|---|
| 2007/0288129 A1 | 12/2007 | Komer et al. | |
| 2008/0048908 A1 | 2/2008 | Sato | |
| 2008/0114504 A1 | 5/2008 | Goodman et al. | |
| 2008/0154486 A1 | 6/2008 | Coulmeau | |
| 2008/0167885 A1 | 7/2008 | Judd et al. | |
| 2008/0288169 A1 | 11/2008 | Meunier et al. | |
| 2009/0130982 A1 | 5/2009 | Coulmeau et al. | |
| 2009/0326936 A1 | 12/2009 | Nagashima | |
| 2010/0030400 A1 | 2/2010 | Komer et al. | |
| 2010/0030401 A1 | 2/2010 | Rogers et al. | |
| 2010/0094532 A1 | 4/2010 | Vorona | |
| 2010/0152924 A1 | 6/2010 | Pandit et al. | |
| 2010/0199280 A1 | 8/2010 | Vestal et al. | |
| 2010/0250025 A1 | 9/2010 | Vasek et al. | |
| 2010/0253595 A1 | 10/2010 | Szczerba et al. | |
| 2010/0332054 A1 | 12/2010 | Brandao et al. | |
| 2011/0224849 A1* | 9/2011 | Braly ................ B64D 45/0031 |
| | | | 701/9 |
| 2012/0010763 A1 | 1/2012 | Goodman et al. | |
| 2012/0075124 A1 | 3/2012 | Whitlow et al. | |
| 2012/0078447 A1 | 3/2012 | Mcguffin et al. | |
| 2012/0078450 A1 | 3/2012 | Marche et al. | |
| 2012/0253649 A1 | 10/2012 | Mcguffin | |
| 2013/0103297 A1 | 4/2013 | Bilek et al. | |
| 2013/0158991 A1 | 6/2013 | Dong et al. | |
| 2014/0253585 A1 | 9/2014 | Paul Dominic et al. | |
| 2014/0336915 A1 | 11/2014 | Pakki et al. | |
| 2015/0081137 A1 | 3/2015 | Gannon et al. | |
| 2015/0251771 A1 | 9/2015 | Whitlow et al. | |
| 2016/0019794 A1 | 1/2016 | Dominic et al. | |
| 2016/0047674 A1 | 2/2016 | Ramaiah et al. | |
| 2016/0090097 A1* | 3/2016 | Grube ................... B60W 40/08 |
| | | | 340/576 |
| 2016/0140849 A1 | 5/2016 | Ball et al. | |
| 2016/0155435 A1 | 6/2016 | Mohideen | |
| 2016/0161283 A1 | 6/2016 | Shamasundar et al. | |
| 2016/0373184 A1 | 12/2016 | Oder et al. | |
| 2017/0039858 A1 | 2/2017 | Wang et al. | |
| 2017/0076611 A1 | 3/2017 | Shamasundar et al. | |
| 2017/0243496 A1 | 8/2017 | Mccann et al. | |
| 2017/0336803 A1 | 11/2017 | Crozier et al. | |
| 2018/0061243 A1 | 3/2018 | Shloosh | |
| 2018/0261104 A1 | 9/2018 | Jonak et al. | |
| 2018/0364707 A1 | 12/2018 | Bosworth et al. | |
| 2019/0033862 A1* | 1/2019 | Groden ................ G05D 1/0055 |
| 2019/0090800 A1* | 3/2019 | Bosworth ............ A61B 5/0015 |
| 2019/0213429 A1* | 7/2019 | Sicconi ................... G06F 3/012 |
| 2019/0250601 A1 | 8/2019 | Donahoe et al. | |
| 2019/0346992 A1 | 11/2019 | Sampath et al. | |
| 2020/0335084 A1 | 10/2020 | Wang et al. | |
| 2021/0026354 A1 | 1/2021 | Alves et al. | |
| 2021/0034053 A1* | 2/2021 | Nikolic ................... G08G 5/22 |
| 2021/0287560 A1 | 9/2021 | Mast et al. | |
| 2021/0375141 A1 | 12/2021 | Gracia Berna et al. | |
| 2022/0230522 A1 | 7/2022 | Myers | |
| 2022/0406201 A1* | 12/2022 | Johnson ................... G08G 5/58 |
| 2023/0057709 A1 | 2/2023 | Naiman et al. | |
| 2023/0215278 A1* | 7/2023 | Kanagarajan ............ G08G 5/34 |
| | | | 340/963 |

OTHER PUBLICATIONS

Lum, Christopher W., et al., "Human-in-the-Loop Distributed Simulation and Validation of Strategic Autonomous Algorithms", 26th AIAAA Aerodynamic Measurement Technology and Ground Testing Conference Jun. 23-26, 2008, Seattle, Washington.

Muliadi, Jemie , et al., "Neural Network Control System of UAV Altitude Dynamics and Its Comparison with the PID Control System", Hindawi, Journal of Advanced Transportation, vol. 2018, Article ID 3823201, 18 pages.

\* cited by examiner

S120

S140

Pilot Attention State             Remote Pilot Involvement

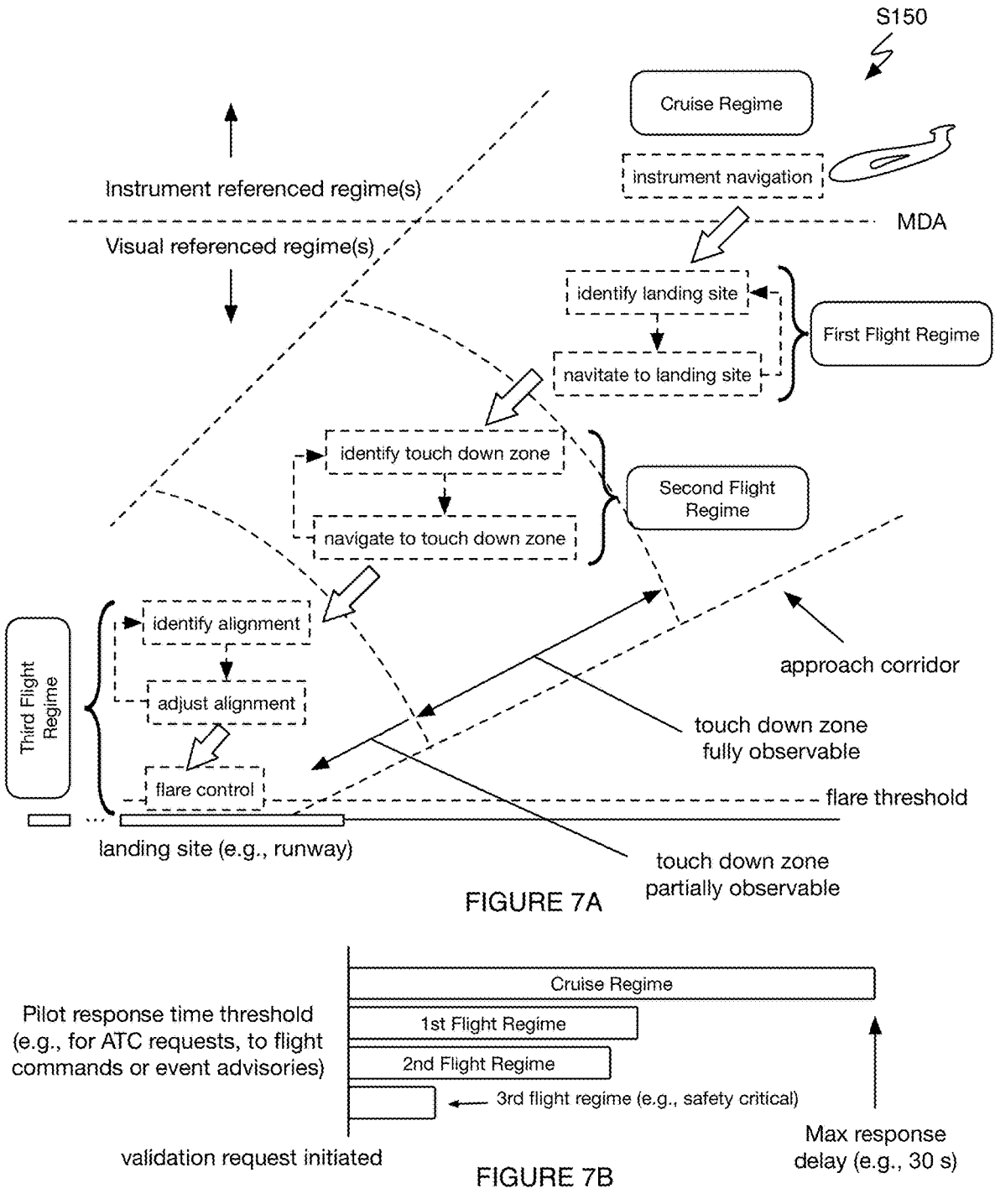

S150

Cruise Regime instrument navigation

Instrument referenced regime(s)

Visual referenced regime(s)

MDA identify landing site navitate to landing site

First Flight Regime identify touch down zone navigate to touch down zone

Second Flight Regime

Third Flight Regime identify alignment adjust alignment flare control approach corridor touch down zone fully observable flare threshold landing site (e.g., runway)

touch down zone partially observable

FIGURE 7A

Pilot response time threshold (e.g., for ATC requests, to flight commands or event advisories)

Cruise Regime

1st Flight Regime

2nd Flight Regime

3rd flight regime (e.g., safety critical)

validation request initiated

Max response delay (e.g., 30 s)

MFD

"Cessna 1357X turn left heading 180"

ATC Message

"left to 180 57X"

Proposed Response

Heading Left 180

Proposed Action

RESPOND
REJECT

ACCEPT
REJECT ALL

SYS    FMS    MAP    DLNK    AUX

SYSTEM AND/OR METHOD FOR PILOT ATTENTION MONITORING

CROSS REFERENCE TO RELATED APPLICATIONS

This application claims the benefit of U.S. Provisional Application No. 63/415,017, filed 11 Oct. 2022, and U.S. Provisional Application No. 63/420,262, filed 28 Oct. 2022, each of which is incorporated herein in its entirety by this reference.

TECHNICAL FIELD

This invention relates generally to the aviation field, and more specifically to a new and useful attention monitoring system and/or method in the aviation field.

BRIEF DESCRIPTION OF THE FIGURES

FIG. 7A is an example of aircraft control in various flight regimes in a variant of the method.

FIG. 7B is an example of pilot response time thresholds for the flight regimes of the variant in FIG. 7A.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
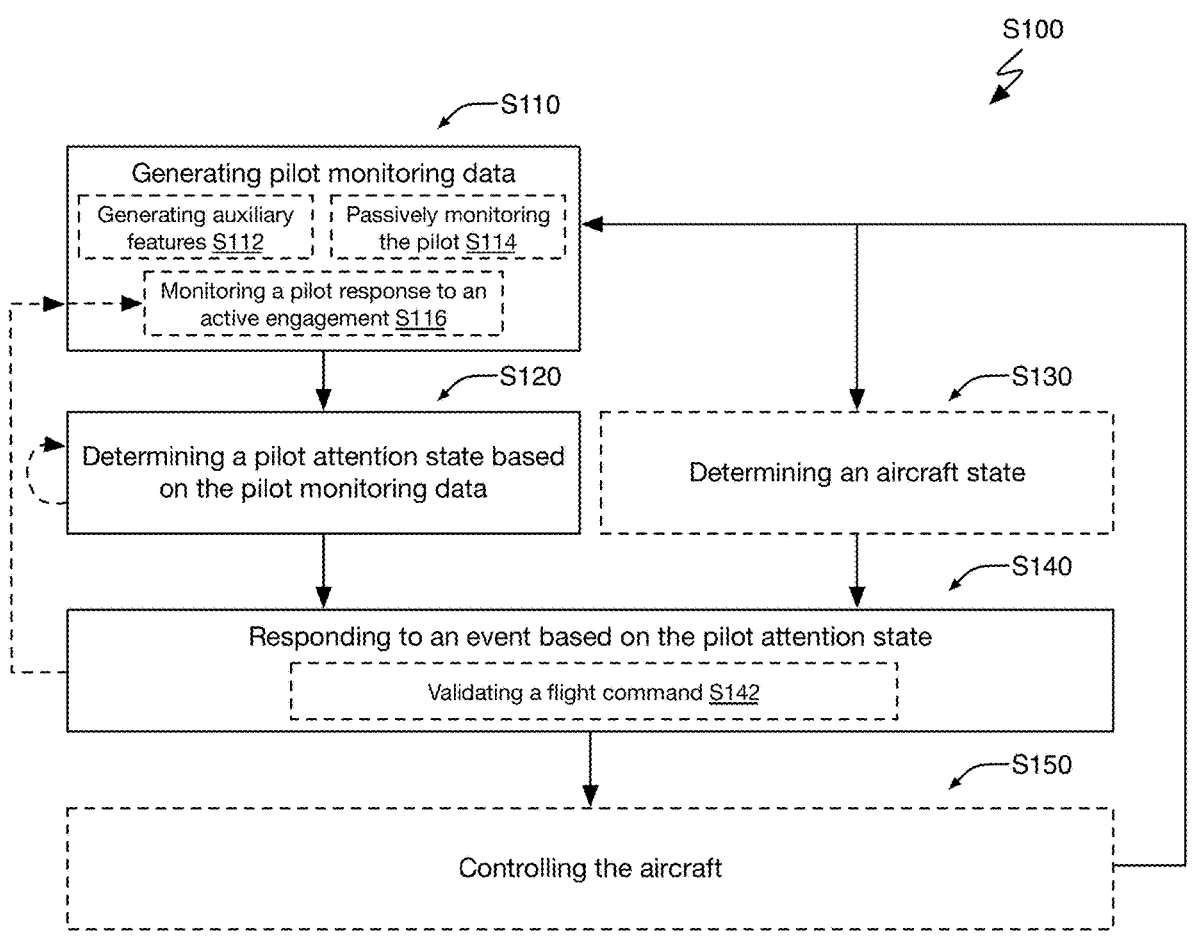
FIG. 1 is a diagrammatic representation of a variant of the method.

The method S100, an example of which is shown in FIG. 1, can include: generating pilot monitoring data S110; determining a pilot attention state based on the sensor data S120; optionally determining an aircraft state S130; responding to an event based on the pilot attention state S140; and can optionally include controlling the aircraft based on the aircraft state and the pilot attention state S150. However, the method S100 can additionally or alternatively include any other suitable set of elements. The method functions to facilitate human-in-the-loop aircraft control by an attentive pilot-in-command (PIC). Additionally or alternatively, the method can function to identify and/or resolve pilot inattentiveness (e.g., based on the context of the aircraft state).

The system 100 and/or method S100 is preferably implemented in conjunction with and/or executed by an aircraft, such as a rotorcraft (e.g., helicopter, multi-copter), fixed-wing aircraft (e.g., airplane), STOL aircraft, lighter-than-air aircraft, multi-copter, and/or any other suitable aircraft. The method can be implemented with a manned aircraft (e.g., with a pilot, with an unskilled operator executing primary aircraft control), semi-autonomous aircraft, single pilot aircraft, multi-pilot aircraft (e.g., with a single pilot), and/or any other suitable aircraft. The aircraft is preferably a human-in-the-loop autonomous aircraft configured to execute flight commands according to a mission plan using a flight processor, with or without user (e.g., pilot) intervention. Additionally or alternatively, the method can be implemented on a human-operated vehicle as a flight aid.

The system and/or method can be implemented in conjunction with a fly-by-wire (FBW) aircraft, manually/mechanically controllable aircraft (e.g., with a mechanical flight control system and/or hydraulic flight control system), and/or any other suitable aircraft or vehicle system(s).

In variants, the system and/or method can be implemented within the low Design Assurance Level (DAL) and/or high DAL portions of the aircraft computing system(s) and/or aircraft computing architecture as described in U.S. application Ser. No. 17/891,845, filed 19 Aug. 2022, titled "ADVANCED FLIGHT PROCESSING SYSTEM AND/OR METHOD", which is incorporated herein in its entirety by this reference. For example, attention monitoring, verification checks, and/or attentional state management/escalation may be implemented at a high DAL portion of the aircraft computing system, with advanced functionalities (e.g., CV vision tracking; natural language processing [NLP] and/or Air Traffic Control [ATC] communication parsing; autonomous navigation, advanced tracking and collision avoidance, etc.) at a low DAL portion of the computing architecture.

In variants, the system and/or method can be implemented in conjunction with semantic parsing of ATC communications as described in: U.S. application Ser. No. 17/500,358, filed 13 Oct. 2021; and/or U.S. application Ser. No. 17/719, 835, filed 13 Apr. 2022, each of which is incorporated herein in its entirety by this reference.

The terms "cockpit" and "flight deck" may be interchangeably referenced herein with regard to the pilot compartment and/or control deck (e.g., where pilot seat and/or controls are housed). However, the terms cockpit and/or flight deck can be otherwise utilized and/or referenced herein.

1.1 Examples

Figure 9A:
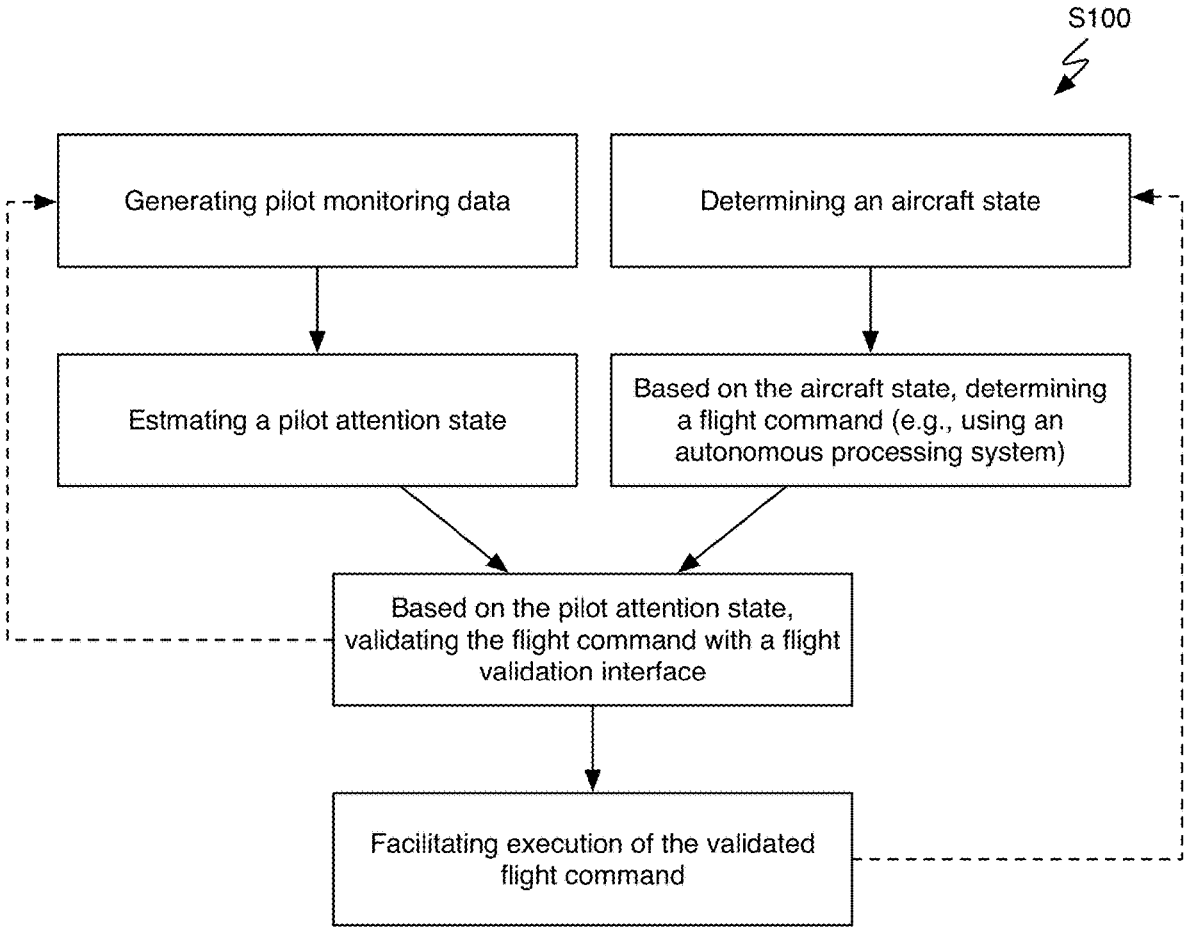
FIGS. 9A-9C are diagrammatic representations of a first, second, and third variant of the method, respectively.

In a first set of variants, an example of which is shown in FIG. 9A, a pilot attention monitoring method can include: generating pilot monitoring data (e.g., biometric data, ATC communication data, query response time, query response accuracy, etc.) and estimating an 'attentive' pilot attention state based on the pilot monitoring data; determining an aircraft state and, based on the aircraft state, determining a flight command (e.g., using an autonomous processing system of the aircraft); based on the pilot attention state, validating the flight command with a flight validation interface of the aircraft (e.g., such as by receiving a confirmation for a semantic query providing a text/visual description of the flight command for pilot review); and facilitating execution of the validated flight command. Parameters associated with the validation of the flight command (e.g., response timestamp, response time, etc.) can be added to the set of pilot monitoring data and used for estimation of future attentiveness.

Figure 9B:
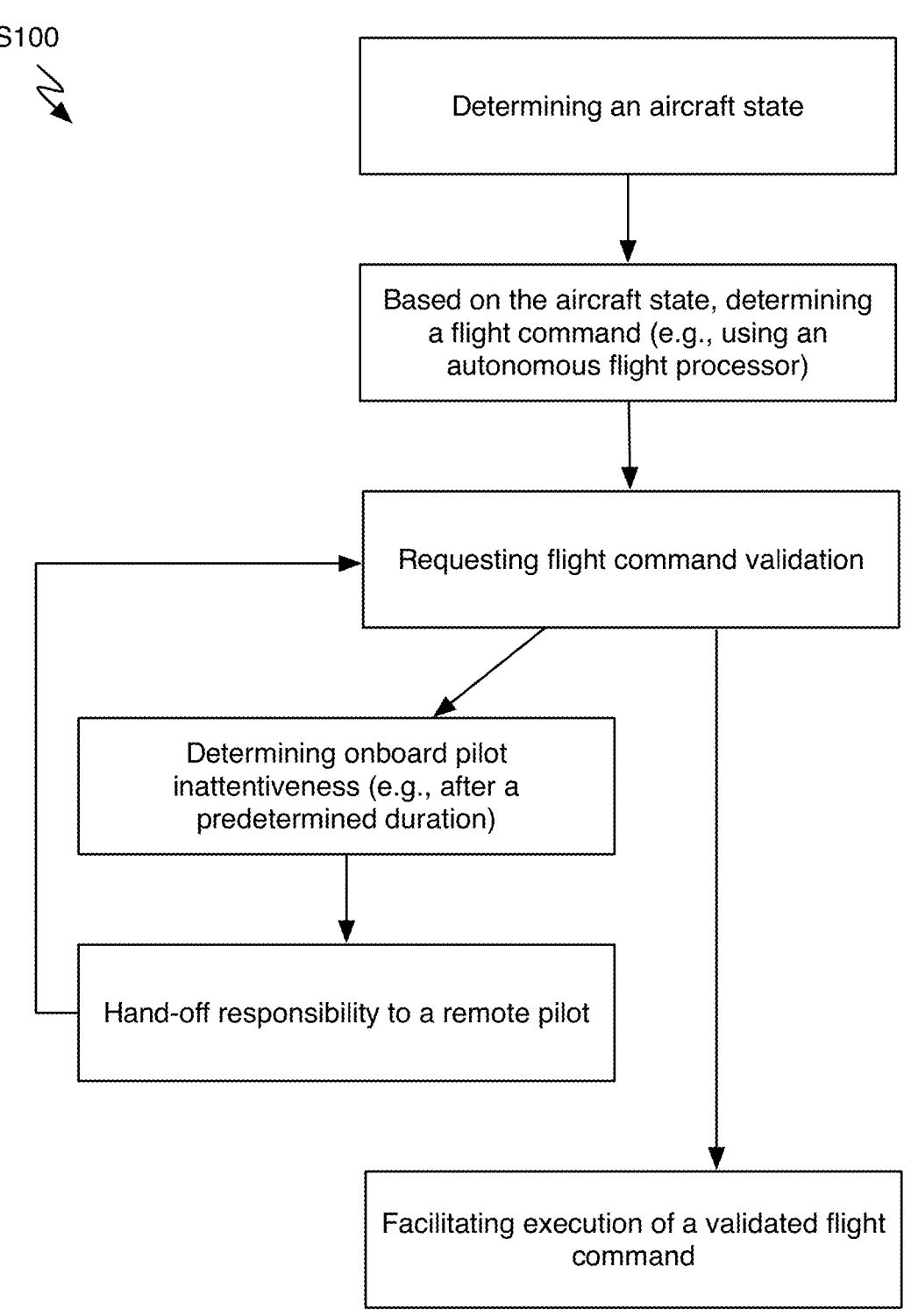

In one variant, an example of which is shown in FIG. 9B, in response to a determination that an onboard pilot is inattentive (e.g., after a predetermined duration in which the pilot fails to respond to a flight command validation request), the system can hand-off command responsibility to a remote pilot (e.g., establishing a remote PIC). The flight command validation request can then be (provided to and) validated by the remote pilot.

Figure 9C:
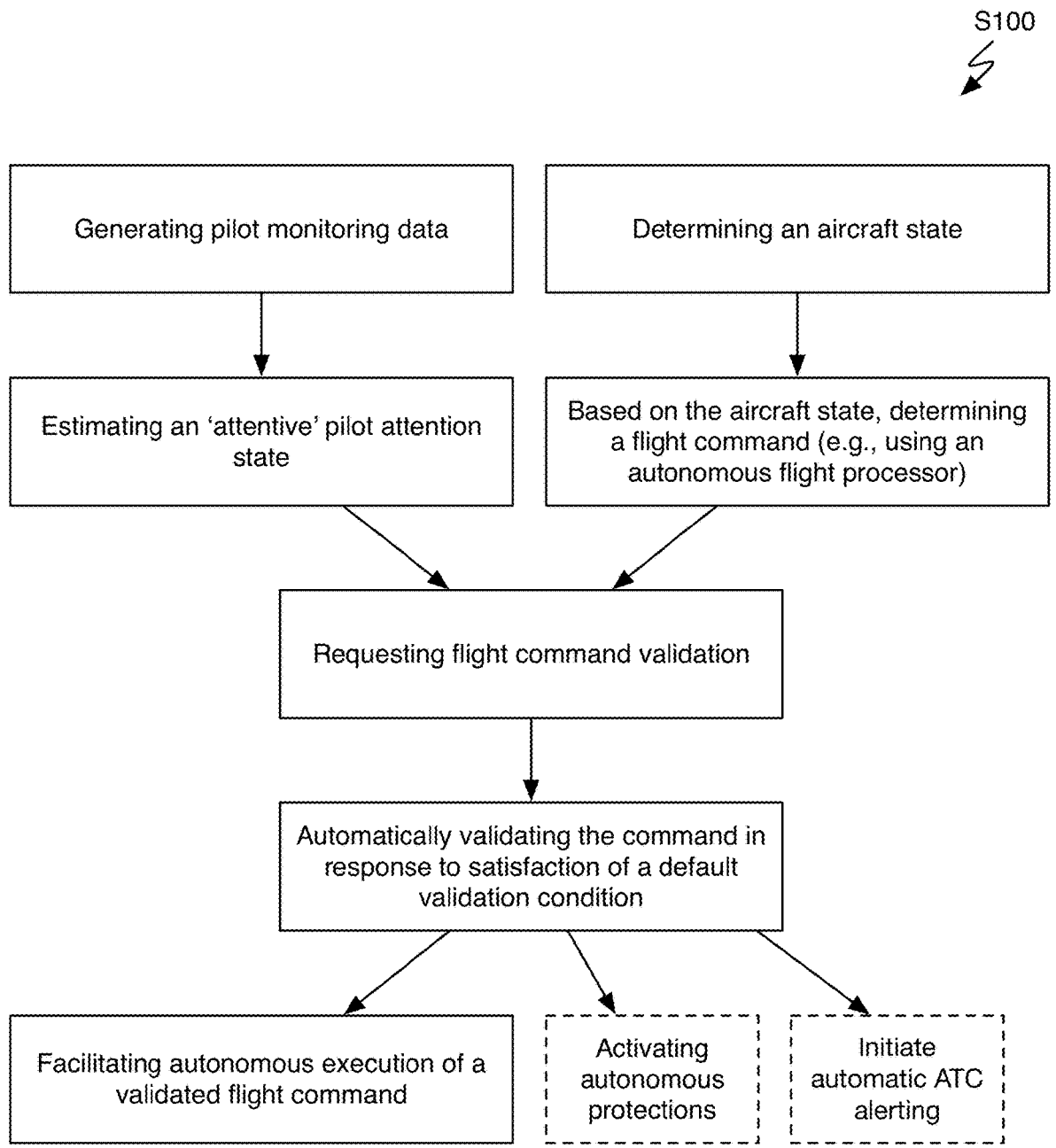

In one variant, an example of which is shown in FIG. 9C, a pilot attention monitoring method can include: generating pilot monitoring data (e.g., biometric data, ATC communication data, response time, response accuracy, etc.) and estimating an 'attentive' pilot attention state based on the pilot monitoring data; determining an aircraft state and, based on the aircraft state, determining a flight command (e.g., using an autonomous processing system of the aircraft); automatically validating the flight command in response to satisfaction of a default authentication condition (e.g., satisfaction of a time threshold corresponding to the flight regime, urgency advisory associated with the command, etc.; after providing the text/visual description of the flight command for pilot review); and facilitating autonomous execution of the validated flight command.

In a second set of variants, nonexclusive with the first set, a system for command of an aircraft can include: an aircraft sensor suite; an autonomous computing system configured to autonomously generate aircraft commands based on sensor data from the aircraft sensor suite; a validation system including: a computing system (e.g., attention monitoring system) configured to determine a pilot attention state by: passively monitoring the pilot; providing stimuli; and monitoring pilot responses to the stimuli; and a pilot interface configured to facilitate, based on a pilot attention state, pilot validation of the autonomously generated aircraft commands; and an aircraft control system configured to execute the autonomously generated aircraft commands responsive to validation by the validation system.

For example, the validation system may be integrated with a Multi-Function Display (MFD) which displays ATC messages (and/or corresponding autonomously-generated aircraft commands) to the pilot for pilot verification/validation. As an example, the ATC messages can be determined by the system(s) and/or method(s) as described in U.S. application Ser. No. 17/500,358, filed 13 Oct. 2021; and/or U.S. application Ser. No. 17/719,835, filed 13 Apr. 2022, each of which is incorporated herein in its entirety by this reference.

Figure 11:
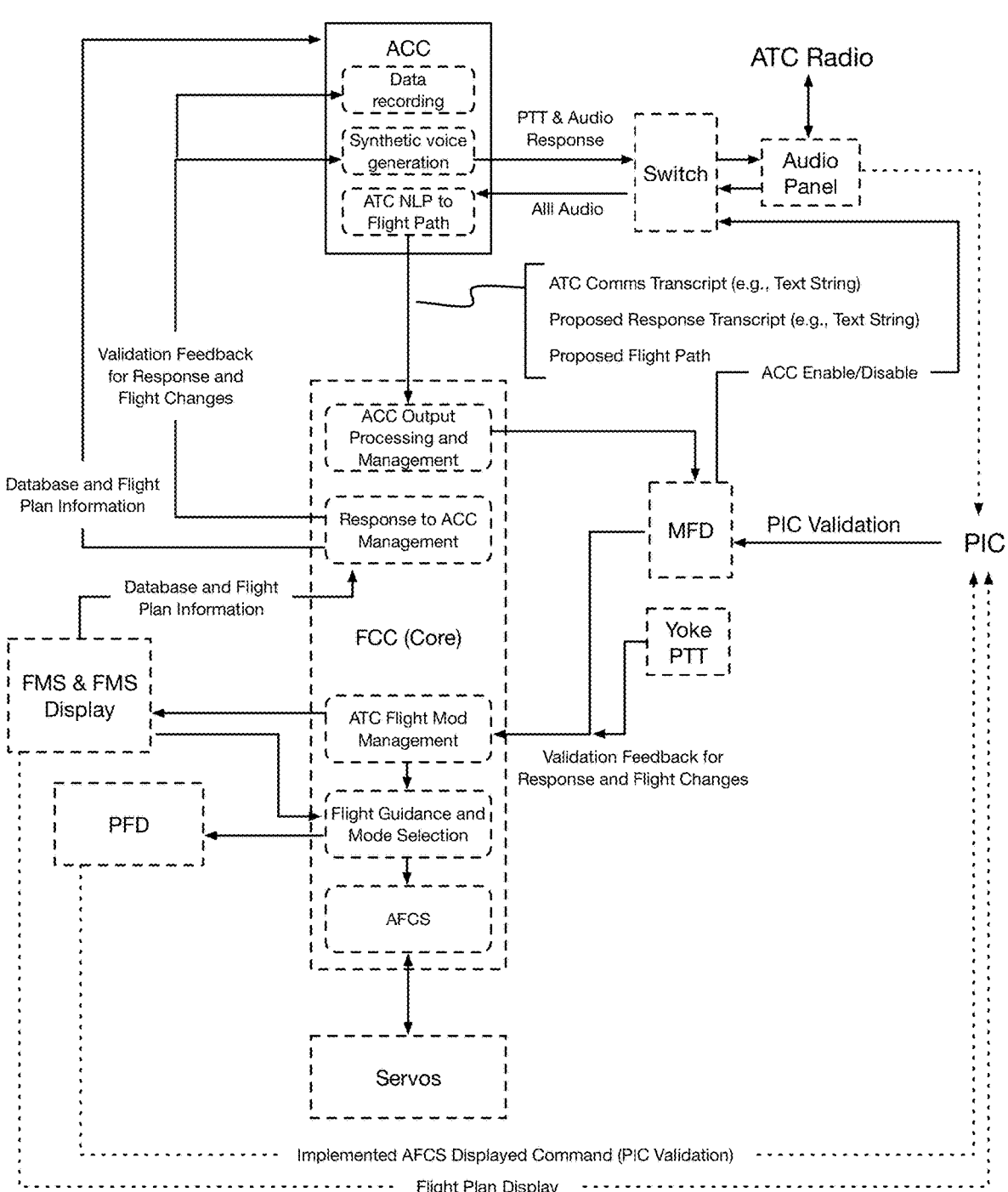
FIG. 11 is a schematic representation of a variant of a system.

An example of command validation using a Multi-Function Display is shown in FIG. 11.

In a third set of variants, nonexclusive with the first or second, a method for command of an aircraft comprising: collecting sensor data with an aircraft sensor suite; determining pilot monitoring data using a set of sensors within a cockpit of the aircraft; at a computing system onboard the aircraft, autonomously generating an aircraft command based on the sensor data; and controlling the aircraft based on the aircraft command, comprising: determining a pilot attention state based on the pilot monitoring data; based on the pilot attention state, validating the aircraft command using a validation interface; and in response to validation of the aircraft command, executing the aircraft command.

In variants, determining the pilot attention state can include estimating an attentiveness score based on multimodal pilot interactions, wherein the aircraft command is validated, using the validation interface, based on the attentiveness score satisfying a predetermined threshold. For example, determining the pilot monitoring data can include: collecting first set of data with the set of sensors within the cockpit; and extracting a second set of features from the first set of data, the second set of features characterizing pilot interactions with the aircraft, wherein the attention score is estimated based on the second set of features. As a second example, the attentiveness score can be estimated at least in part using neural network model which is pre-trained based on historical pilot monitoring data (e.g., historical pilot communications via an air traffic control (ATC) radio, historical interactions via the pilot validation interface, etc.).

2. Benefits

Variations of the technology can afford several benefits and/or advantages.

First, variants can provide increased aircraft safety by enabling identification of pilot inattentiveness and de-risking resolution of pilot inattentiveness. Variants of system and/or method can resolve pilot inattentiveness by actively re-engaging the attention of the pilot, facilitating remote command validation/piloting of the aircraft, and/or autonomously controlling the aircraft. Identification and resolution of pilot inattentiveness can be particularly beneficial for aircrafts with reduced crew (e.g., a single pilot), where inattentiveness can prove deadly and/or where there are fewer humans available to respond in complex emergent scenarios. As a first example, the system can be configured to identify and respond in the event of pilot hypoxia (a condition caused by low blood oxygen levels; which can occur for aircraft pilots flying at altitudes with less available oxygen, such as between 10,000 and 19,000 feet; where a pilot may be unaware that they are hypoxic), which would otherwise inhibit pilot attentiveness and responsiveness (i.e., pilot hypoxia is a leading contributor to aircraft crashes and related deaths). As a second example, autonomous agents and/or autopilot systems can significantly reduce the workload on pilots by eliminating interactions/operations that would otherwise be conventionally performed by the pilot during various flight regimes. For instance, autonomous air traffic control (ATC) communications systems can be configured to automatically transition between radio communication channels (e.g., in response to a request by air traffic control) without direct involvement of the pilot. Without such tasks to keep the pilot engaged and attentive, it can be beneficial to ensure that a pilot is alive and ready to intervene or respond to flight command requests as appropriate. However, variants can otherwise suitably enable identification/response to pilot inattentiveness and/or can otherwise enable attentiveness monitoring for an aircraft pilot-in-command (PIC).

Second, variants can enable remote validation of aircraft operations (e.g., such as autonomously generated commands) and/or remote validation of pilot attentiveness, which can reduce the number of pilots onboard an aircraft. As an example, a system 100 can act in place of a co-pilot (e.g., where a primary pilot validates commands of the co-pilot and/or can be used to train autonomous agents of the system). However, variants can otherwise enable remote validation and/or control of aircraft operations.

Third, variants can minimize the cognitive load on pilots in safety-critical and/or stressful situations, since they can enable persistent augmentation and/or command generation during some or all periods of aircraft operation. As an example, instead of directly intervening in an emergent scenario, an attentive pilot can be responsible for monitoring/validating commands autonomously generated by the aircraft. This can reduce the cognitive load and the complexity of intervention demanded of the pilot. However, in highly automated implementations it can be beneficial to confirm that the pilot is attentive/able (e.g., as a cross-check; to enable system and/or aircraft certification; etc.), since such circumstances might otherwise enable pilots to mentally disengage (e.g., fall asleep, lose focus, etc.), which could be harmful to their safety and/or negatively impact air travel operational efficiency (e.g., dozing pilots have been known to overshoot their destination airport by many miles). Variants of the system can likewise accommodate varying levels of pilot attentiveness/inattentiveness in various flight regimes (e.g., for instance: a pilot may be able to read a book in cruise, but may be relied upon to respond within 5 seconds during a landing sequence). However, variants can otherwise reduce cognitive load for pilots and/or otherwise suitably automate/augment aircraft control.

Fourth, variations of this technology can include an approach necessarily rooted in computer technology for overcoming a problem specifically arising in the realm of computer networks. In variants, the technology can enable control of an aircraft using a partially and/or fully autonomous system. In a first example, the system/method may act in place of an incapacitated pilot (e.g., for a manned aircraft) and/or replace an onboard pilot (e.g., for an unmanned aircraft). In a second example, automated verification of pilot attentiveness may enable certification of human-in-the-loop automated/autonomous aircraft systems which might be otherwise uncertifiable (e.g., thus solving a challenge which necessarily arises in the realm of flight automation/autonomy).

However, variations of the technology can additionally or alternately provide any other suitable benefits and/or advantages.

3. Method

The method S100, an example of which is shown in FIG. 1, can include: generating pilot monitoring data S110; determining a pilot attention state based on the pilot monitoring data S120; determining an aircraft state S130; responding to an event based on the pilot attention state S140; and can optionally include controlling the aircraft based on the aircraft state and the pilot attention state S150. However, the method S100 can additionally or alternatively include any other suitable set of elements. The method functions to facilitate human-in-the-loop aircraft control by monitoring the attentiveness of a pilot-in-command (PIC). Additionally or alternatively, the method can function to identify and/or resolve pilot inattentiveness (e.g., based on the context of the aircraft state).

3.1 Monitoring

Generating pilot monitoring data S110 functions to generate feedback data associated with the pilot's actions (e.g., interactions, behavior, etc.), mental/physical capacity, and/or any other suitable data pertaining to a pilot's attention state. Pilot monitoring data is preferably generated using pilot monitoring systems onboard the aircraft and/or sensors associated therewith, but can additionally or alternatively be generated offboard the aircraft, such as based on remote PIC feedback at a remote monitoring interface and/or based on communications from an air traffic controller.

Monitoring data can be collected by onboard sensors, human machine interface (HMI) sensors (e.g., push-button inputs, touchscreen inputs, a multi-function display, audio panel, etc.; such as at a validation interface), remote sensors (e.g., remote validation interface sensors, ground station sensors such as time-of-flight sensors monitoring the aircraft, etc.), audio sensors (e.g., ATC radio, pilot headset, etc.), force sensors (e.g., force sensing at stick/inceptor, weight/pressure sensing integrated into pilot seat), optical sensors (e.g., internal-facing cameras arranged in cockpit oriented toward pilot seat, external facing cameras, etc.), haptic sensors, biometric sensors (e.g., pulse oximeter, heart rate sensor, blood pressure sensor, etc.; integrated into a smartwatch or wrist/neck device; carbon-dioxide sensors, etc.), cabin environment sensors (e.g., carbon dioxide sensor, cabin pressure sensor, etc.); clocks/timers, processors (e.g., flight controllers), and/or any other suitable sensors or pilot data sources. Monitoring data is preferably time-correlated (e.g., stored as a timeseries), but can alternatively be ordered, sequential, batched, and/or otherwise suitably stored. Monitoring data can be collected: continuously; discretely; periodically; aperiodically; in response to an event trigger such as: a response of S140, a validation request, a change in the estimated pilot attention state, a time threshold, a determination of an event advisory (e.g., collision avoidance advisory of an autonomous collision avoidance system, etc.), and/or any other suitable event trigger; and/or any other suitable time.

In variants, generating monitoring data can additionally include generating auxiliary features S112 (e.g., results, summary data, etc.) extracted from raw sensor data. As a motivational example, a hypoxic pilot may often be capable of providing responses to requests or other stimuli, but with decreased accuracy, slower reaction time, and/or degraded speech quality (e.g., speech slurring commonly occurs as a result of hypoxia; hypoxic pilots are frequently unaware that they are hypoxic). For instance—a hypoxic pilot may be physically capable of pressing a button or providing a verbal response to a request, and thus it can be advantageous to rely on multiple monitoring sensors and/or auxiliary features extracted therefrom to estimate the pilot's attentiveness more accurately (e.g., based on a slow response time, based on slurred/nonsensical speech, based on an identification of grammatical or reading comprehension errors, etc.). Auxiliary features can include: a result/score of a cognitive test, a response/reaction time (e.g., for an individual request—such as a command validation request, to an attentiveness test, to an event trigger, etc.; "say again" aural prompt), a natural language quality metric (e.g., extracted/determined from a natural language pilot response, such as may be generated using a natural language processing and/or based on a remote monitoring system or remote operator; a grammar metric, a speech/pronunciation metric, etc.), natural language transcripts, a deviation from historical data (e.g., historical average response times, speech clarity, etc. for the pilot or population thereof), and/or any other suitable features which can be determined from the raw sensor data. Auxiliary features can be determined onboard the aircraft (e.g., at an aircraft processor), offboard the aircraft (e.g., at a ground station or remote monitoring location), at a remote processor (e.g., cloud processing system), and/or at any other suitable endpoint. Auxiliary features are preferably generated in real time (or near real time, such as within a few seconds), but can additionally or alternatively be generated during flight (e.g., such as for more advances offboard analysis of audio or optical data), and/or with any other suitable frequency/timing. Auxiliary feature processing can be centralized, distributed, redundant (e.g., triply redundant, redundancy at each compute location, etc.), performed onboard the aircraft, performed offboard the aircraft, and/or otherwise suitably performed. However, auxiliary features can be otherwise suitably determined.

The features may characterize multimodal pilot interactions with the aircraft, such as aural comprehension, reading comprehension, speech quality, grammatical clarity, haptic responsiveness, and/or any other pilot/attentiveness characterizations. Additionally or alternatively, features may characterize a semantic query response time and/or a semantic query response accuracy (e.g., where queries may request pilot to provide aircraft state parameters and/or information for which a deterministically 'correct' answer exists, such as the aircraft configuration, aircraft state, altitude, tail number, required pilot responses, text transcripts, etc.; evaluated by NLP or otherwise, etc.).

In variants, S110 can include passively (non-invasively) monitoring the pilot S114, which functions to generate monitoring data independent of the pilot attention state and/or based on baseline tasks nominally required of the pilot (e.g., which can vary based on flight regime). More specifically, S114 can enable continuous (or near continuous, high frequency, etc.) data monitoring of the pilot without providing a frequent distraction or annoyance, since this might negatively impact the pilot and/or might disadvantageously increase the cognitive load of the pilot. Passive monitoring can include biometric monitoring (e.g., which can enable rapid detection of catastrophic changes to a pilot's physical health, such as heart attack or stroke, even before the pilot fails to perform the next validation task), haptic monitoring (e.g., which can demonstrate that the pilot is physically present), computer vision pilot tracking (e.g., head pose determination, head pose tracking over time, etc.), monitoring of radio exchanges between the pilot air traffic control, monitoring features (e.g., auxiliary features) extracted from flight tasks (e.g., for the given flight regime), flight command monitoring (e.g., whether the pilot's flight command is expected for the aircraft state), and/or any other suitable passive monitoring. In a specific example, passive monitoring can enable a pilot to read a book (without distraction) for minutes at a time (e.g., 10 minutes) while in a cruise regime of flight. However, S110 can include any other suitable passive/non-invasive pilot monitoring.

In some variants, pilot monitoring data can include pilot inputs received at a communication validation system, such as may be used to verify and/or respond to Air Traffic Control [ATC] communications via the ATC radio and/or autonomously-generated commands associated therewith (e.g., examples are shown in FIGS. 10A-10E and FIG. 11).

In variants, S110 can optionally include monitoring a pilot response to an active engagement S116 which functions to actively evaluate the pilot based on the pilot attention state (e.g., an unverified attention state; as part of a response from S140). Active engagement of the pilot can include providing a stimulus (e.g., in accordance with Block S140; as part of a pilot attention audit) and generating data based on a pilot response. Stimuli to actively engage the pilot can include: an audio stimulus (e.g., a natural language audio query, an alert sound, CAS alert, etc.; ATC radio request), visual stimulus (e.g., visual indicator/light on at HMI/display, text display at a visual interface or MFD), haptic stimulus (e.g., haptic alert via a motion of a shaker-stick inceptor, haptic alert via a wearable device such as a wrist device, haptic alert via a pilot seat), and/or any other suitable stimulus. The stimulus can be provided by the system (e.g., at the MFD), by the aircraft, by an external system (e.g., ATC, a ground station, etc.), and/or by any other suitable system. Monitoring of active engagement can be automatic/autonomous (e.g., such as based on S140; playing predetermined/prerecorded audio query, dynamically determining a natural language query and providing an audio stimulus via an automatic text-to-speech translation, etc.) and/or can involve a remote operator (e.g., a remote pilot/co-pilot).

As an example, a radio communication channel can be opened between the pilot and a remote pilot (e.g., second radio channel while continuously maintaining/monitoring an ATC radio communication stream), and the remote pilot can manually generate/provide pilot monitoring data (e.g., provide a manual confirmation that the pilot is attentive). Active monitoring can occur as a response to S140, but can additionally or alternatively occur with any other suitable relationship/timing in the method.

As a second example, the pilot may be audited (e.g., periodically; after a period of inactivity) to verify attentiveness by active engagement of the pilot via S116. For instance, a periodic audit of the pilot attention (e.g., requesting that the pilot toggle a stick; requesting that the pilot confirm state data, etc.) may occur during an 'attentive' state based on a trigger event (e.g., periodic, etc.); a degraded response (or failure to respond) to the audit may escalate the alert state, which may trigger further audits, queries, escalations, control hand-off to a remote pilot, and/or other responses in accordance with S130. Additionally or alternatively, the pilot may be alerted/audited in degraded pilot attention states (e.g., pilot inattentiveness alert data; pilot inattentive state; emergency state; etc.) in an attempt to re-engaged the pilot (attentiveness).

However, pilot monitoring data can be otherwise suitably generated/collected.

In variants, pilot audits can include queries based on the aircraft state (and/or pilot attention state), which may be predetermined (e.g., predefined list of verification questions), dynamically determined (e.g., based on most recent flightpath changes; etc.), and/or otherwise suitably determined. In a first example, a pilot may be asked to provide current state information for the aircraft (e.g., which may be compared against the known parameters; as part of a semantic text query). Additionally or alternatively, audits may include cognitive tests which are independent of the aircraft state (e.g., CAPTCHA test, etc.). Audit queries preferably have predefined answers (e.g., which may be used to deterministically evaluate the accuracy of a response; binary response accuracy; etc.), but can additionally or alternatively be used to evaluate non-deterministic cognitive parameters (e.g., scoring responses to open-ended questions; non-deterministically scoring/evaluating speech accuracy, grammatical accuracy, response time, etc.).

However, the pilot may be otherwise audited, and/or pilot monitoring data can be otherwise based on any other suitable queries or information requests.

3.2 Pilot Attention State

Determining a pilot attention state based on the pilot monitoring data S120 functions to determine (e.g., estimate) pilot attentiveness at a particular instant, which can be used to establish a PIC (responsible party) for event response handling. The pilot attention state is preferably estimated based on a sliding window of historical pilot monitoring data (e.g., last N minutes up to a current/instantaneous time; last 30 seconds, last 5 minutes, last 10 minutes, etc.), but can alternatively be estimated based on historical pilot monitoring data throughout the duration of the flight and/or data collected from historical flights (e.g., by the same pilot and/or other pilots). Additionally or alternatively, the pilot attention state can be determined based on a previous pilot attention state (e.g., as part of a state diagram transitioning between states based on event triggers).

Figure 5:
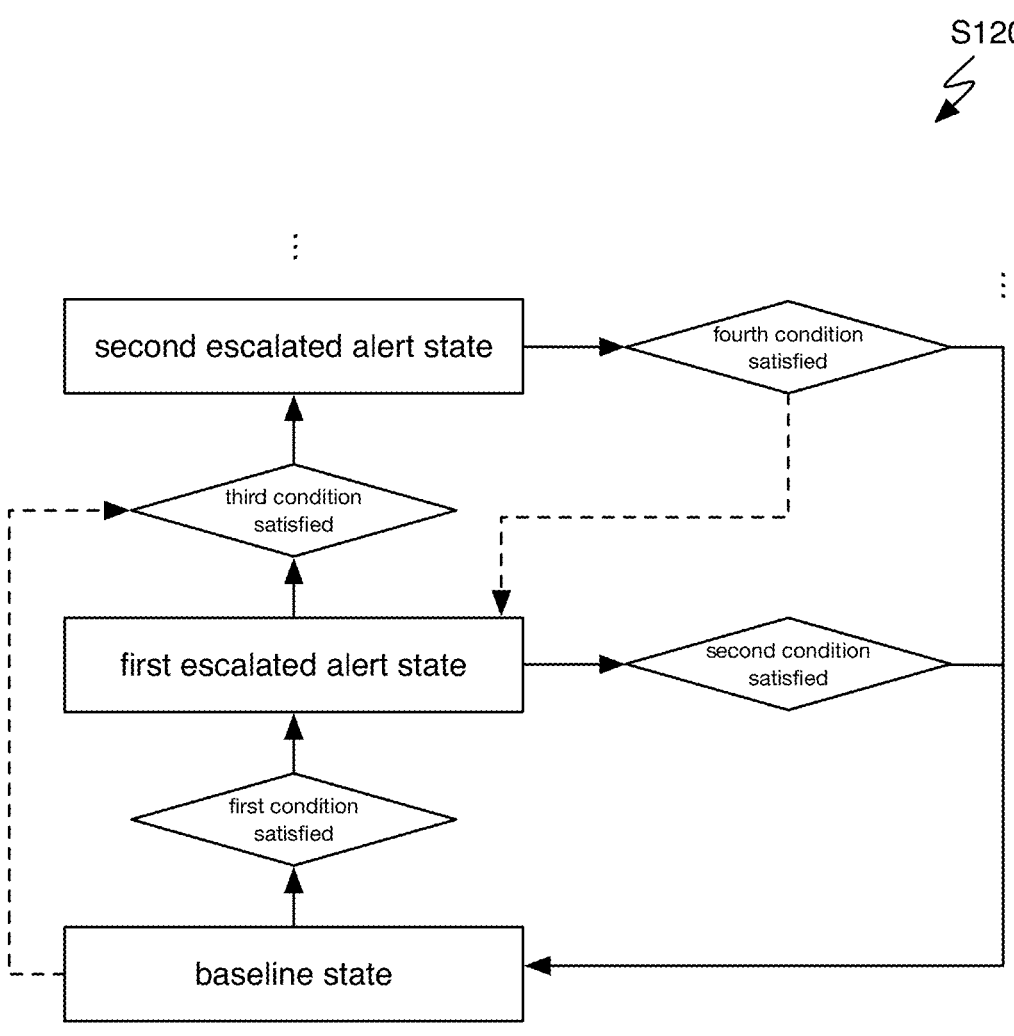
FIG. 5 is an example diagrammatic representation of a determination of a pilot attention state in a variant of the method.
Figure 6:
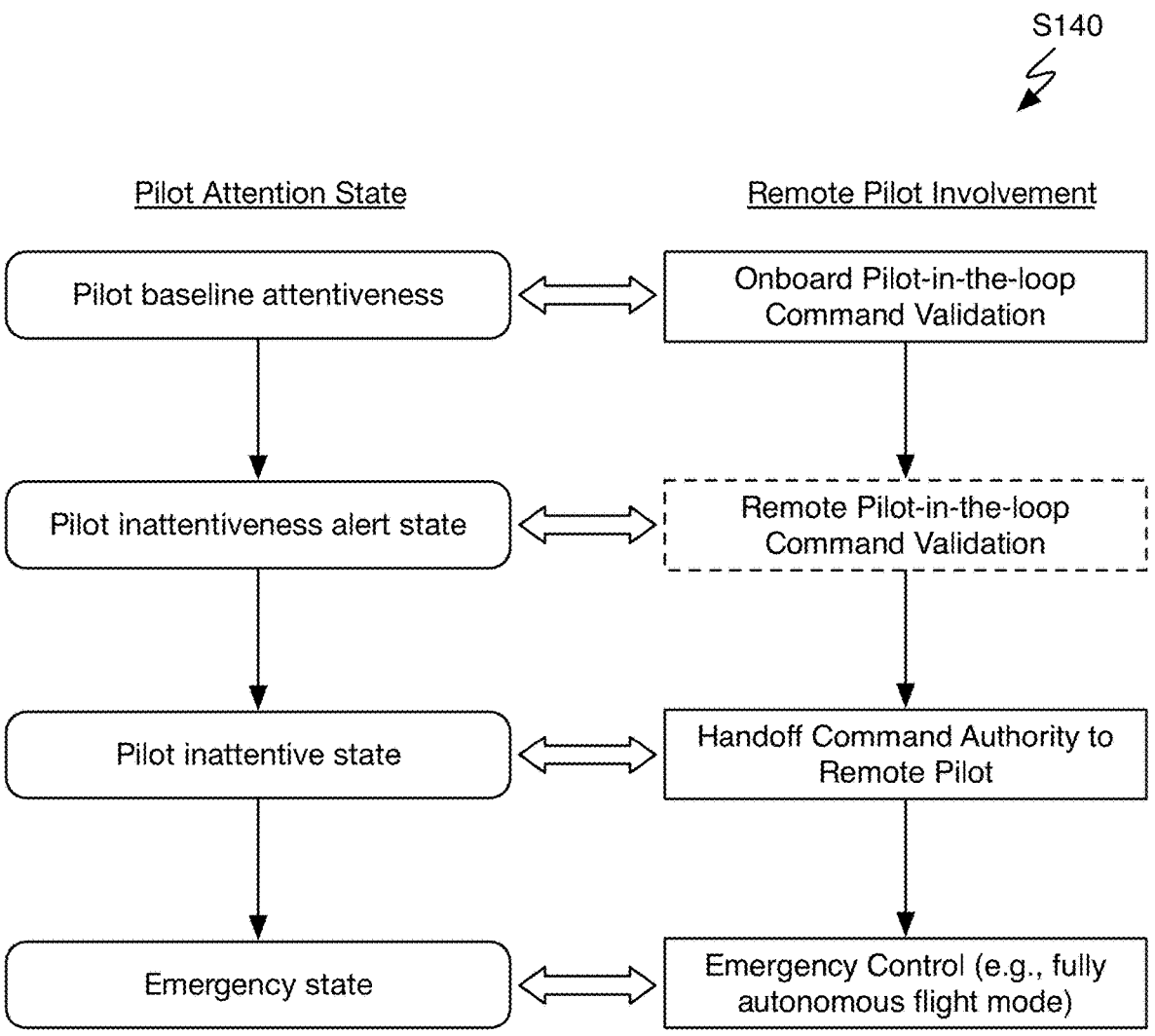
FIG. 6 is an example mapping of responses and/or remote pilot involvement in a variant of the method.

The pilot attention state is preferably estimated as a selection from a predetermined (finite) set of attention states, but there can alternatively be a continuum of attention states, discrete set of attention states, infinite set of attention states, and/or any other suitable number of pilot attention states. In one variant, an example of which is shown in FIG. 6, the set of pilot attention states can include a baseline attentiveness state (e.g., in which the onboard pilot provides command validation) and a series of escalating inattentiveness states (an example is shown in FIG. 5), such as: a pilot inattentiveness alert state (e.g., in which the system may attempt to re-engage the pilot according to S140; in which a remote pilot may optionally provide pilot-in-the-loop validation of flight commands), a pilot inattentive state (e.g., in which command authority is handed off to a remote pilot—such as by the request of the onboard pilot or when a remote pilot invalidates a command request neglected by an onboard pilot), and an emergency state (e.g., in which a pilot is incapacitated, in which the plane declares an emergency and sets a transponder to a frequency of 7700 Hz, etc.). However, there can be any suitable set of pilot attention states and/or sub-states within each of the aforementioned states. In variants, the attention states can be connected and/or related sequentially (e.g., a series of escalations, hierarchical, etc.), in a tree-based state structure, (e.g., fully connected, not fully connected, directed, undirected, complete, incomplete, etc.), and/or the attention states can be otherwise suitably related. Alternatively, the attention state can be deterministically recomputed without a direct relationship to prior attention state.

In variants, the pilot attention state can be determined/estimated based on a determination of an attentiveness score, which can be generated for individual parameters/features of the pilot monitoring data and/or a plurality of features (e.g., cooperatively generating a single attentiveness score). In one variant, an attentiveness score can be generated according to a set of predetermined rules, heuristics, and/or statistical calculations associated with the pilot monitoring data. Pilot attention state estimation can be deterministic or nondeterministic. Pilot attention state estimation can be explainable (e.g., interpretable) or not explainable. In one variant, a set of attentiveness models can be used to generate an attentiveness score based on one or more parameters/features of the pilot monitoring data. The set of models can include: a neural network (e.g., deep neural networks; CNN, RNN, FCN, ANN), a cascade or ensemble of neural networks, Bayesian networks, Markov models (e.g., Markov chains, hidden Markov models, etc.), predetermined rules, probability distributions, heuristics, probabilistic graphical models, classifiers (e.g., binary classifiers, multiclass classifiers), or other models. As an example, a neural network language model can be pretrained to generate an attentiveness score estimating the amount of 'slurring' in a pilot's speech (e.g., pretrained based on a training dataset of slurred speech and/or ATC communications). As a second example, a pretrained neural network or another model can be used to generate an attentiveness score based on the response time and/or response accuracy (e.g., in responding to a cognitive test). As a third example, a neural network can be trained to identify clear speech for the pilot (e.g., based on historical communications from the pilot, based on communications where the ATC did not request pilot clarification or escalate the pilot for further review), wherein the clear speech classification, non-classification, and/or deviation away from clear speech can be used to generate the attentiveness score. As a fourth example, the attentiveness score can be estimated with a network model which is pretrained based on historical pilot monitoring data, which can include historical pilot communications via an air traffic control (ATC) radio, historical interactions via the pilot validation interface, and/or any other suitable data. As a fifth example, the pilot attention state can be determined using both the features (extracted from pilot monitoring data) and parameter values (within the pilot monitoring data) directly measured via the set of pilot monitoring systems/sensors.

Figure 4:
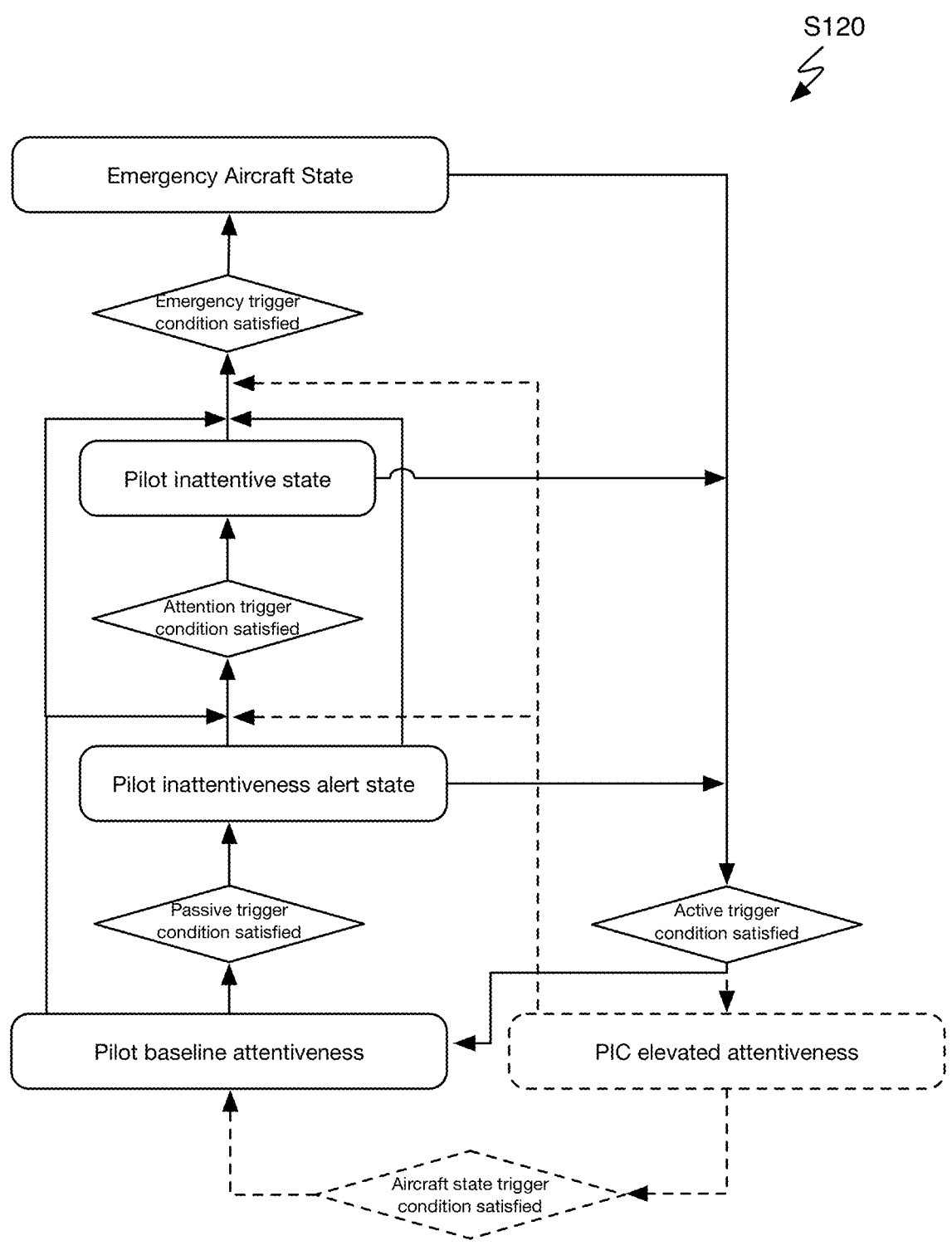
FIG. 4 is an example diagrammatic representation of a determination of a pilot attention state in a variant of the method.

In variants, examples of which are shown in FIGS. 4 and 5, a pilot attention state can transition between the set of predefined attention states in response to a satisfaction of an event trigger (e.g., determined based on the pilot monitoring data). Event triggers can include: a passive trigger (e.g., biometric trigger, temporal trigger, etc.), an active trigger (e.g., receipt of a response request from a human, receipt of a response request from an autonomous agent, ATC request, ground station request, pilot request, etc.), an attentiveness score trigger (e.g., an attentiveness score falls within a predetermined range of values, an attentiveness score exceeds a predetermined threshold, etc.), and/or any other suitable trigger(s).

Figure 2:
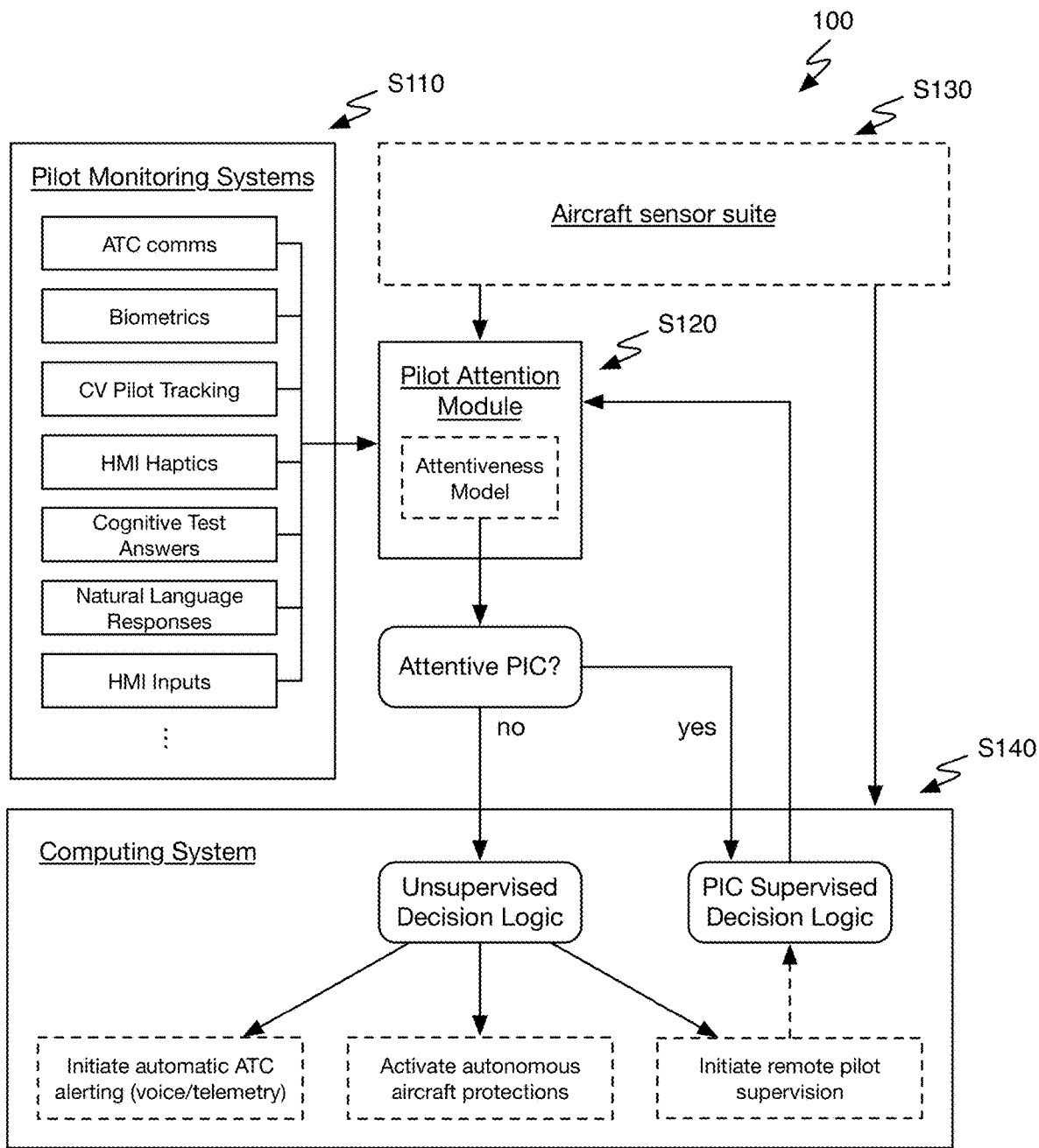
FIG. 2 is a schematic representation of a variant of the system.

Block S120 is preferably performed onboard the aircraft (e.g., at an aircraft processor; redundantly), but can additionally or alternatively be performed offboard the aircraft, such as at a ground station or remote monitoring location (e.g., to facilitate an awareness of pilot attentiveness). In a specific example, Block S120 is executed at a pilot attention module executing on a certified processing system of the aircraft (e.g., high DAL; an example is shown in FIG. 2), but can additionally or alternatively include uncertified portions (e.g., executing on low DAL processors) and/or can be otherwise suitably executed.

Block S120 preferably maintains a continuous and/or persistent estimation of the pilot attention state, but can alternatively occur periodically, in response to an event trigger such as a receipt of a flight command or resolution advisory, receipt of an ATC utterance associated with the aircraft, and/or with any other suitable frequency/timing.

In variants, the pilot attention state can be continuously/persistently communicated to the pilot (e.g., as feedback), such as via a status light, MFD, and/or other HMI system(s). Additionally or alternatively, only escalated pilot attention states may be communicated to the pilot, and/or the pilot may request attention state feedback (e.g., toggling a display interface, etc.). However, the pilot attention state and/or any status information associated therewith (e.g., attentiveness score; etc.) can be otherwise provided to the pilot with any other suitable timing/frequency.

In variants, such as when responding to an onboard emergency (e.g., fire in the cockpit) or other condition requiring pilot attention (and/or resulting in degraded pilot attention), the pilot may self-report attentiveness degradation and/or request remote intervention. As an example, the pilot may request partial control handoff (a.k.a., blended control) and/or complete control handoff to a remote pilot. As a second example, the pilot may manually request remote assistance (e.g., via an input mechanism such as a MFD, via a pilot radio, etc.) with noncritical flight tasks.

In such scenarios, the pilot may be notified of the pilot attention state and/or corresponding control status (e.g., blended control with remote pilot; full control by remote pilot, etc.), such as via an HMI or MFD.

In variants, pilot notifications, feedback provision, and/or requests/queries may be specific to various (degraded) attention states. For example, in a degraded pilot attention state, the current commands, control changes, and/or configuration changes may be displayed to the pilot (e.g., in semantic language, such as via the MFD) and/or provided with an aural update (e.g., from a remote PIC and/or synthetic voice generator).

However, the pilot attention state can be otherwise suitably estimated.

3.3 Aircraft State

Determining an aircraft state S130 functions to provide context for response urgency and/or interpreting pilot attentiveness. Additionally or alternatively, the aircraft state can be used to determine aircraft control and/or aircraft responses. The aircraft state is preferably determined based on an onboard sensor suite, but can additionally or alternatively be determined at a ground station based on ground infrastructure, ATC communications, a flight plan, and/or any other suitable aircraft sensor data. In a first variant, the aircraft state and/or parameters thereof can be received from a flight controller (e.g., FMS, FCS, autonomous processing agents, etc.) via a wired connection (e.g., for processing onboard the aircraft) and/or via wireless communication (e.g., used for separate processing at a remote endpoint; via radiofrequency and/or satellite communications). The aircraft state can be determined by fusing any suitable set of aircraft sensors, remote sensors, and/or control states (e.g., flight regimes) used for aircraft control S150.

The aircraft state preferably includes a flight regime (e.g., corresponding to control logic in S150). The aircraft can be controlled in S150 in various regimes of flight, such as 'cruise', 'approach' (e.g., landing sequence), 'go-around maneuver', and/or any other suitable flight regimes, which can be provided as an aircraft state parameter. The aircraft control in S150 based on the aircraft state (and/or each parameter therein) can be the same or different for the various flight regimes (an example is shown in FIG. 7A). In a specific example, the flight regimes can include: an IFR flight regime (e.g., cruise), a VFR flight regime (e.g., approach corridor regimes, flare control regime, etc.), and/or any other suitable flight regimes. In a second example, the flight regimes and/or transitions therebetween can be as described in U.S. application Ser. No. 17/674,518, filed 17 Feb. 2022, which is incorporated herein in its entirety by this reference. In variants, the aircraft state can include positional parameters, such as: the geodetic position of the aircraft, the attitude (e.g., pitch, roll, and yaw/heading) of the aircraft, a linear velocity vector of the aircraft, an angular velocity vector of the aircraft, a linear acceleration vector of the aircraft, an angular acceleration vector of the aircraft, a relative wind velocity of the aircraft, an above ground level (AGL) altitude of the aircraft, and/or any other suitable positional parameters. In variants, the aircraft state can additionally or alternatively include flight envelope parameters and/or envelope protection state, effector parameters (e.g., flap position, propeller RPM, etc.), and/or any other suitable state parameters. In variants, the aircraft state can include a risk advisory status received from one or more autonomous aircraft agents, such as: a flight protection status, a collision avoidance advisory, a terrain avoidance advisory, a weather avoidance advisory, an ATC advisory (e.g., extracted via NLP), and/or any other suitable advisories/statuses. However, the aircraft state can include any other suitable parameters and/or can be otherwise suitably determined.

However, the aircraft state can be otherwise suitably determined.

3.4 Response

Figure 8:
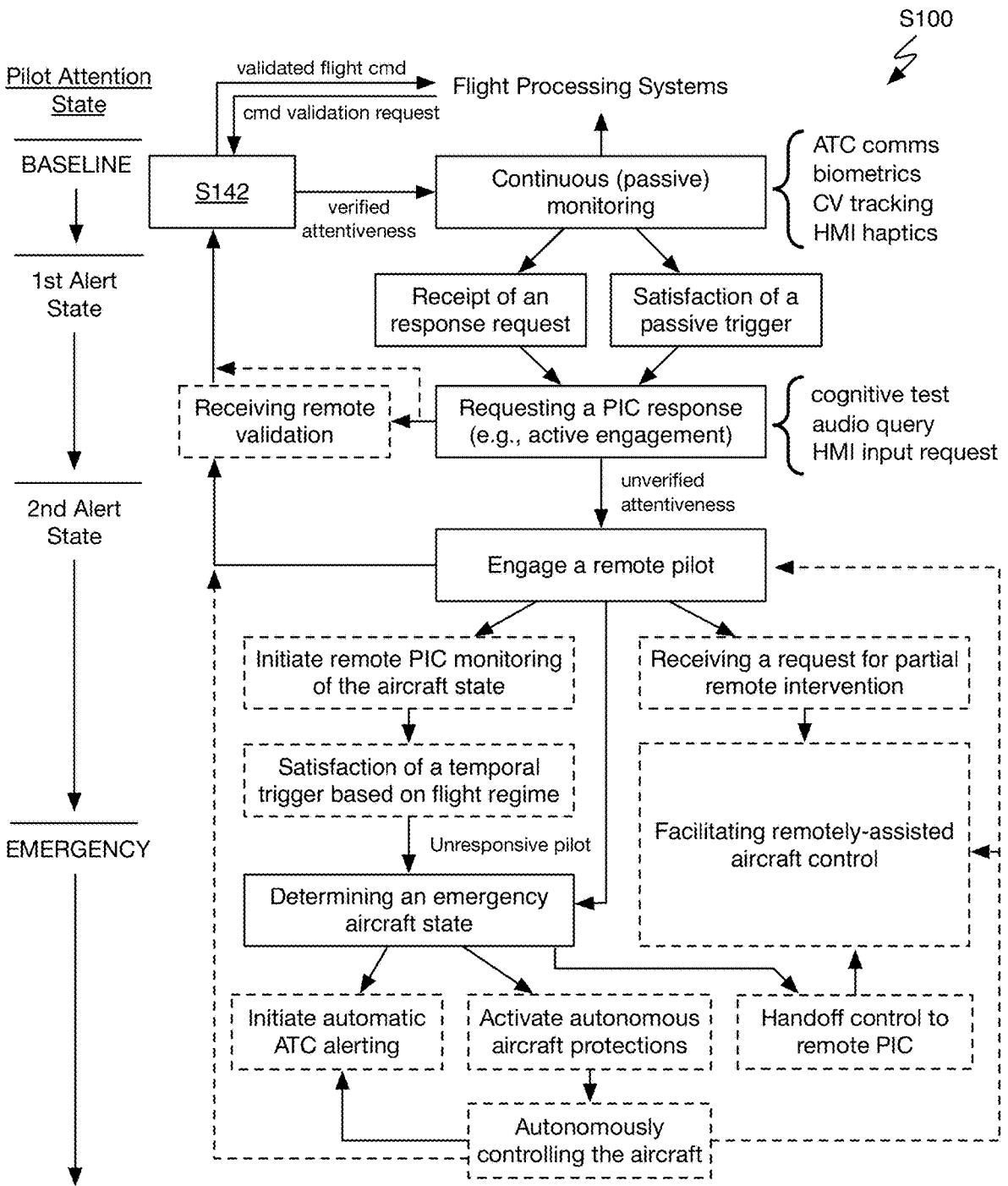
FIG. 8 is a diagrammatic representation of a variant of the method.

Responding to an event based on the pilot attention state S140 functions to maintain an attentive pilot-in-command (PIC) of the aircraft (e.g., as the responsible authority). Additionally or alternatively, S140 can function to validate autonomously generated commands based on the PIC attention state (an example is shown in FIG. 8). Additionally or alternatively, S140 can function to validate commands without the involvement of a pilot in the cockpit (e.g., for an inattentive/incapacitated pilot). Events responded to in S140 can include: pilot attention state triggers (e.g., transitions between pilot attention states), receipt of an aircraft resolution advisory (e.g., as determined in S130), receipt of a request (e.g., flight command validation request, ATC communication request, ground station communication request, etc.) and/or receipt of a command validation, satisfaction of a PIC response time condition (e.g., failure of pilot to respond within a maximum time threshold dynamically determined based on the aircraft state and/or aircraft flight regime—an example of which is shown in FIGS. 7A-B), and/or any other suitable events. Events can be conditionally dependent on the aircraft state and/or a flight regime of the aircraft (e.g., time triggers may be dependent on the flight regime), or can be independent of the aircraft state. In a specific example, an event can include detecting a missed radiofrequency channel transition and/or a failure to respond to a communication request directed to the pilot. However, any other suitable events can be responded to in S140.

Responses can be determined according to a set of predetermined rules, decision trees, and/or heuristics based on the PIC attention state, or be otherwise determined. Responses and/or response mapping can be conditionally dependent on the aircraft state (e.g., flight regime of the aircraft). As an example, in a cruise condition, the system may be configured to repeatedly respond to a determination of an inattentive pilot in one or more modalities (e.g., visual alert, haptic alert, audio alert, opening a communication channel to a ground station operator/pilot, etc.; CAS alert) without automatically executing a flight command validation request neglected by the pilot, whereas during a landing sequence the system may simply execute the flight command and alert the pilot, ATC, and/or the ground station that the command is being automatically executed. However, response mapping can additionally or alternatively be deterministic and/or otherwise independent of the aircraft state and/or flight regime.

In variants, responding to an event can include engaging the pilot via a sensory stimulus (e.g., audio, haptic, visual, etc.). A pilot's response can then optionally be monitored to assess attentiveness in accordance with block S110 and S120. In one variant, engaging the pilot can include a cognitive test (e.g., related to flight control, unrelated to flight control, etc.), where a passable response to the cognitive test (e.g., a correct answer, an answer in the same domain, etc.) can serve as a precursor to requesting (or accepting) a command validation from the pilot. For example, S140 can include: responsive to satisfaction of trigger condition (e.g., an elapsed time period without a pilot validation input at an input mechanism, such as an MFD; attention state trigger; etc.), providing a pilot stimulus at the validation interface. A pilot response to the pilot stimulus can then be evaluated (e.g., using the set of sensors within the cockpit, input mechanism of the validation interface, etc.) to determine pilot monitoring data (and an updated attention state). However, the response can additionally or alternatively include: vibrating the pilot seat or flight controller, applying an electrical shock, triggering an alert system/alarm, or otherwise providing sensory stimuli to the pilot.

In variants, responding to an event can include: actively engaging a pilot (e.g., to check attentiveness, such as in response to a passive trigger; periodically); handing off control to a remote pilot (e.g., in response to a determination of pilot inattentiveness); transitioning to an emergency aircraft state (e.g., setting a transponder to a predetermined emergency frequency, etc.); initiating automatic voice/telemetry ATC alerting; activating autonomous aircraft protections (e.g., collision avoidance, terrain avoidance, weather avoidance, NLP command adjustments from an ATC radio stream, etc.); facilitating remotely-assisted aircraft control (e.g., partially or complete handoff of controls to a remote PIC); initiating remote PIC monitoring of the aircraft state; requesting partial remote intervention; and/or any other suitable responses.

When pilot attentiveness can be verified and/or relied upon (e.g., based on the pilot attention state; in a default attention state; where the attention score satisfies a predetermined threshold, etc.), the pilot may validate flight commands and/or facilitate operation of the aircraft. Where the pilot attentiveness cannot be verified based on the pilot attention state, S140 may initiate a series of escalations/interventions (e.g., examples are shown in FIGS. 4, 5, and 6; trigger-based and/or condition-based escalations according to a predetermined set of rules) to facilitate aircraft command (validation) and control of the aircraft by an (attentive) pilot.

In variants, responding to an event can include validating a flight command S142. The validated flight command can then be provided to an onboard processing system (e.g., FCS/FMS) to facilitate execution in accordance with S150. In a first example: in a baseline attentiveness state, a flight command can be validated in response to receipt of a command validation input from the pilot (e.g., within a flight regime dependent time window). In a second example, in a pilot inattentiveness alert state, a flight command can be validated in response to a receipt of a command validation input from the pilot in conjunction with a passable response to a cognitive test or other query. In a third example, in a pilot inattentiveness alert state, a flight command can be validated in response to a receipt of a remote pilot command validation. In a fourth example, in a pilot inattentive state, a response can include handing off command authority to a remote pilot in response to a transition into the pilot inattentive state. In a fifth example, an autonomously generated flight command can be automatically validated (and executed) in an emergency state of the aircraft.

Figure 3:
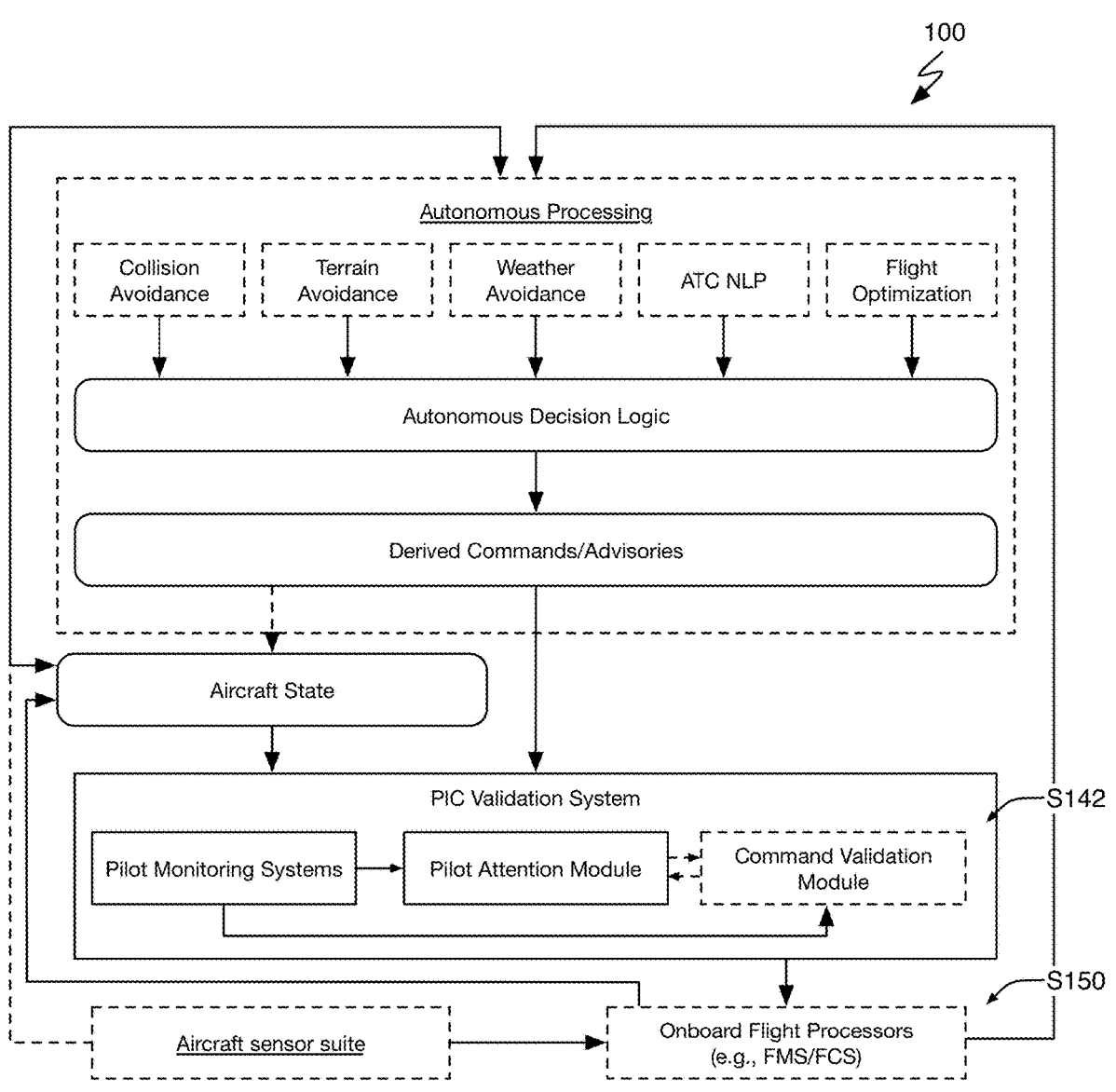
FIG. 3 is a schematic representation of a variant of the system.

Flight commands are preferably validated by a command validation module (e.g., an example is shown in FIG. 3) onboard the aircraft, such as within a certified high DAL processing system of the aircraft (e.g., redundant, deterministically testable, etc.), but can be otherwise suitably validated. For example, flight commands can be validated with the validation interface as described in U.S. application Ser.

No. 17/891,845, filed 19 Aug. 2022, titled "ADVANCED FLIGHT PROCESSING SYSTEM AND/OR METHOD", which is incorporated herein in its entirety by this reference.

In variants, S140 can include blended (remote) control and/or complete authority handoff to a remote pilot (e.g., where a pilot may be fully incapacitated, for example). In such cases controls and/or control authority may be governed by a federated safety control box (e.g., on the aircraft and/or at a remote teleoperation facility) which may require one or more remote confirmations in order to facilitate partial/complete authority handoff (e.g., via a multi-key protocol; multi-endpoint system, where the pilot or a secondary remote operator may provide one key/node). Additionally or alternatively, in degraded attention states, command validation may require: validation and/or verification of commands by both the onboard pilot and a remote pilot, transferal of PIC authority to a remote pilot, and/or automatic validation of a command (e.g., based on satisfaction of a default authentication condition; which may result in fully autonomous execution of the command in some emergency scenarios, for example).

The onboard pilot may be notified/alerted (e.g., in a degraded attention state) of: the pilot attention state, control authority status (e.g., blended control, fully remote control, etc.), remotely originated/validated command (e.g., by way of a text and/or audio description), aircraft state/configuration changes, safety critical control changes, non-safety critical control changes, and/or may be otherwise notified of any other suitable information. For example notifications/feedback may be provided via a validation interface, HMI, MFD, and/or other suitable system(s). As an example, the pilot may be provided a text description of an autonomously executed command(s) and/or a remotely validated command (s).

However, there can be any other suitable response based on the pilot attention state and/or aircraft state.

The method can optionally include controlling the aircraft S150, which functions to enable traversal of the aircraft based on validated flight commands and/or event responses from S140. In variants, S150 can include modifying a mission plan including a set of navigation parameters—such as waypoints—which flight systems (e.g., FMS and FCS) can utilize to control the aircraft from a departure site to a landing site (e.g., based on the aircraft state). In variants, S150 can include controlling flight actuators (e.g., via the FMS and/or FCS) to modify the aircraft state. In variants, S150 can include controlling the aircraft according to a predetermined mission sequence in response to receipt of the flight command (e.g., where the flight command can include an event trigger: such as a PIC validated confirmation to proceed to a subsequent step of the mission sequence).

S150 preferably occurs in response to a validation of the flight command, such as by a PIC or by satisfaction of a default validation condition (in accordance with block S140), however the execution of flight commands can continue: persistently, until the command is overridden by a subsequent flight command, until an event trigger is satisfied (e.g., satisfaction of a predetermined time threshold, satisfaction of a predetermined aircraft location, etc.; as may be specified by a termination condition of a flight command), and/or any other suitable frequency/timing. Additionally or alternatively, flight commands can be executed once (e.g., a single instance course correction), repeatedly, and/or can be otherwise suitably executed. However, flight commands can be otherwise suitably executed and/or the aircraft can be otherwise controlled.

In an alternate variant, S150 can facilitate manual remote control by a remote PIC (e.g., in a manual operation mode, such as with a streamed video feed and duplicated cockpit display, etc.), such as in response to a command handoff in S140.

However, the aircraft can be otherwise suitably controlled. Alternatively, the system and/or method can be used in a monitoring context which is decoupled from aircraft control and/or not used for aircraft control.

4. System

Figure 12:
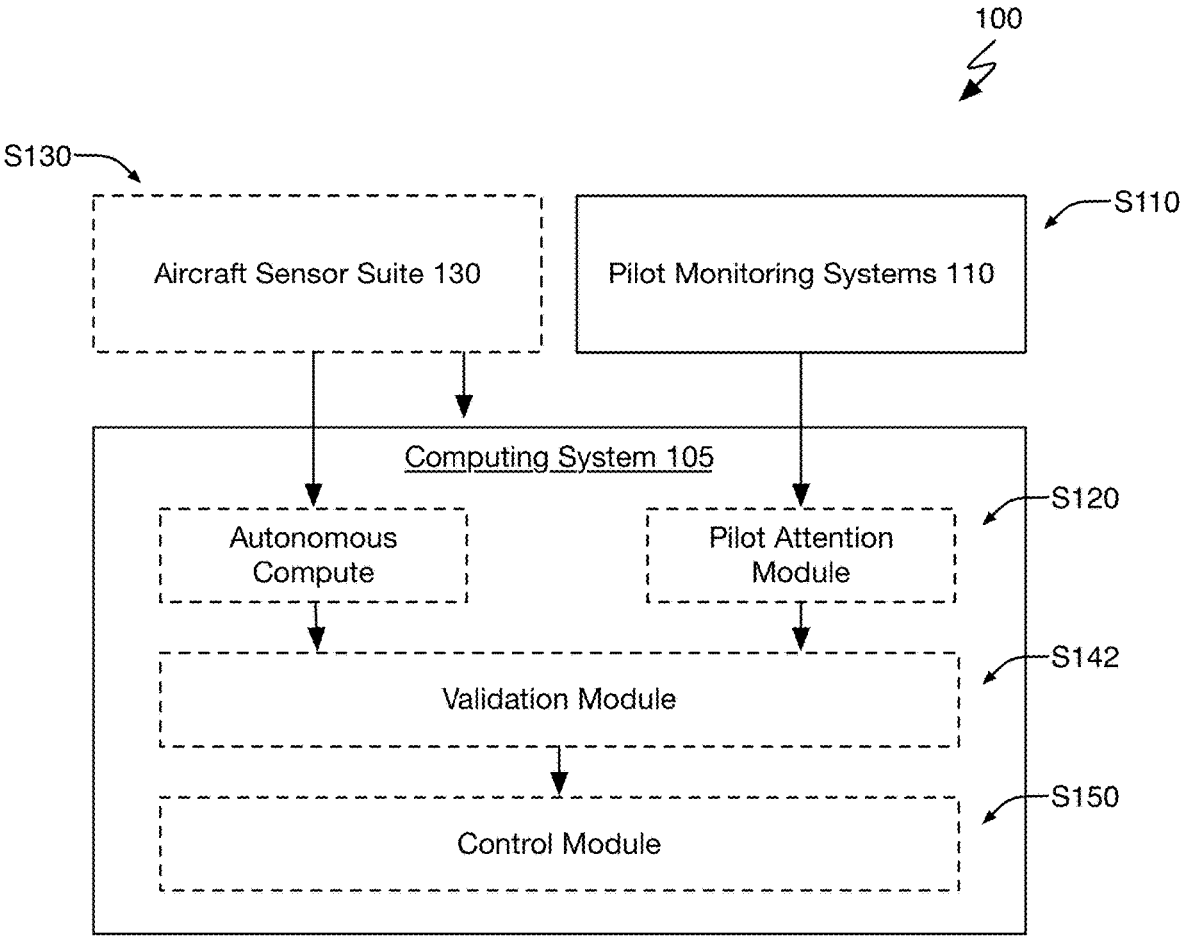
FIG. 12 is a schematic representation of a variant of a system.

The system 100, an example of which is shown in FIG. 12, can include: a computing system 105 and a set of pilot monitoring systems 110. The system 100 can optionally include an aircraft sensor suite 130. However, the system 100 can additionally or alternatively include any other suitable set of components. The system 100 functions to facilitate execution of the method S100. Additionally or alternatively, the system 100 can function to facilitate pilot validation of autonomously generated aircraft commands based on a pilot attention state; and/or can verify pilot attentiveness to facilitate coordinated operation of an aircraft between an autonomous pilot and a human pilot (e.g., for a multi-pilot aircraft).

The computing system 105 can include: a pilot attention module which executes S120, a validation module which executes S142, and/or any other suitable subsystems and/or computing modules. The computing system 105 can optionally include or operate in conjunction with an autonomous processing module (e.g., which functions to autonomously generate commands), a control module which executes S150, and/or any other suitable elements. For example, the computing system can be the computing system as described in U.S. application Ser. No. 17/891,845, filed 19 Aug. 2022, titled "ADVANCED FLIGHT PROCESSING SYSTEM AND/OR METHOD", which is incorporated herein in its entirety by this reference. The computing modules and/or processing nodes of the computing system 105 can be centralized, distributed, separately partitioned (e.g., the autonomous computing module can be partitioned from the validation and control modules), and/or otherwise configured.

In one variant, the system 100 can include or operate in conjunction with a pilot validation system (e.g., an example is shown in FIG. 3), which functions to facilitate pilot validation of autonomously generated aircraft commands. For example, a pilot validation system can include the pilot monitoring systems 110, a pilot attention module (of the computing system 105), and a command validation module (of the computing system 105). As a second example, the pilot validation system can be integrated via a Multi-Function Display (MFD) and/or Yoke input (e.g., Push to Talk [PTT] switch), an example of which is shown in FIG. 11.

The set of pilot monitoring systems 110 functions to facilitate execution of Block S110. Pilot monitoring systems can include: dedicated pilot monitoring hardware (e.g., cockpit camera or flight deck camera; after-market integration; flight aid installation/provision; etc.), pilot input devices (e.g., pilot controls; MFD; HMI systems; etc.), ATC radio, a command validation interface, a communication validation interface and/or any other suitable pilot monitoring system(s) and/or input device(s).

The system 100 can optionally include or operate in conjunction with an aircraft sensor suite 130, which functions to facilitate aircraft state estimation in accordance with Block S130. However, the system 100 can alternatively operate without an aircraft sensor suite and/or can be otherwise suitably configured.

However, the system can include any other suitable elements and/or can be otherwise configured.

5. Communication Validation

Figure 10A:
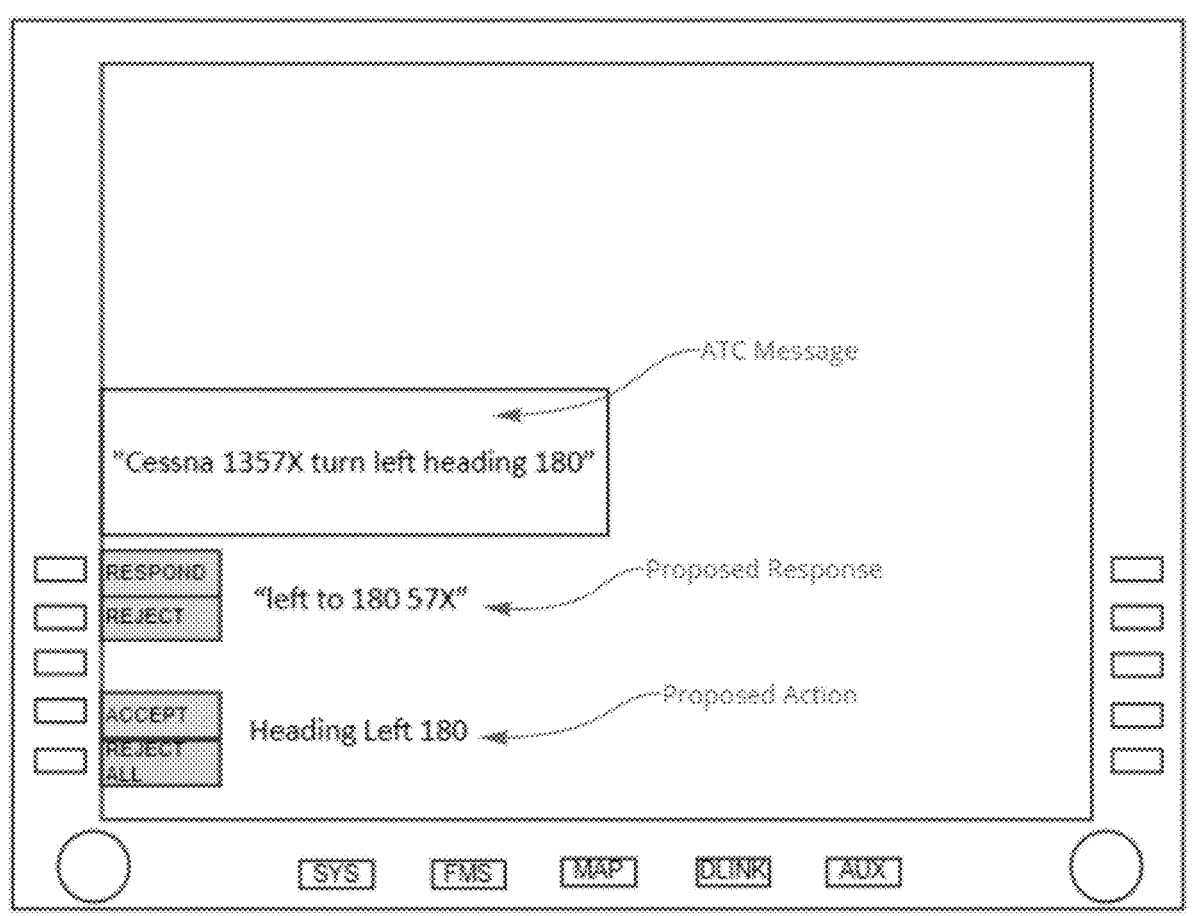
FIGS. 10A-10E are examples of a Multi-Function Display (MFD) in one or more variants of the system and/or method.

In one set of variants, the system can optionally include and/or can be utilized with a Multi-Function Display (MFD) which functions to display ATC messages to the pilot (e.g., with a speech to text functionality and/or semantic parsing of key parameters/information), provide the system inputs response and action validation, and/or provide pilot monitoring inputs (e.g., an example MFD screen is shown in FIG. 10A; a variant of the system integrating a MFD is illustrated in FIG. 11). For each ATC command, the system can display information to the pilot, which can include: the original ATC message, the proposed response (e.g., when applicable; in a dedicated or persistently allocated space/region of the display; as a pop-up menu or notification; etc.), the proposed action to take (e.g., when applicable; in a dedicated or persistently allocated space/region of the display; as a pop-up menu or notification; etc.), and/or any other suitable information.

The screen can also display options for rejecting and accepting the proposed response and/or command. The options can be activated by soft buttons, a touch screen located on the MFD (e.g., via a touch screen input such as a touch, press-and-hold, swipe, etc.), and/or via any other input components. In variants, options can additionally be confirmed/validated by a secondary input (e.g., soft button confirmation) after a selected action and/or buttons may be physically distanced/separated (e.g., which may reduce/avoid pilot errors or inadvertent actions). In variants, reading in Push-To-Talk [PTT], such as by Automatic Speech Recognition (ASR), can be used to confirm or cancel automated responses to ATC.

In variants, in addition to the accept/reject options on the MFD, the Pilot can have an additional method to accept or reject the proposed responses via a two position switch located on the yoke. The first position can accept a proposed response. The second position can both reject a proposed response (when available) and provide/activate the Pilot's PTT function. As an example, the two-position switch can replace an existing single position PTT switch (e.g., which may be natively integrated on a certified aircraft). Due to the frequency of ATC messages, the yoke switch may provide a more ergonomic option compared to the MFD buttons. This option can also reduce changes to the procedure for responding to ATC.

Figure 10B:
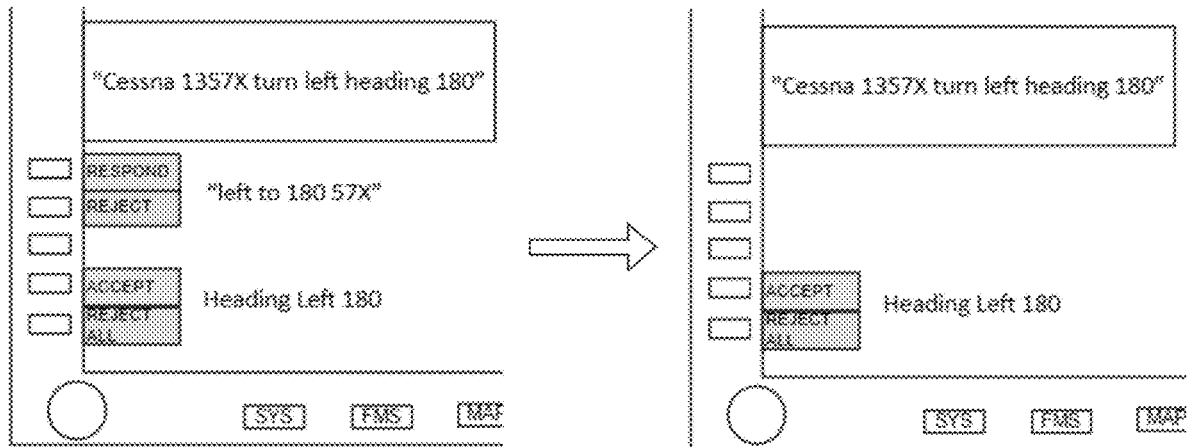

In variants, after the message is displayed, the pilot can accept or reject the proposed response. This can cause the proposed response to clear, leaving the only remaining actions to accept/reject the proposed action (e.g., an example is shown in FIG. 10B). After the pilot accepts/rejects the proposed action, the entire message can clear.

Figure 10C:
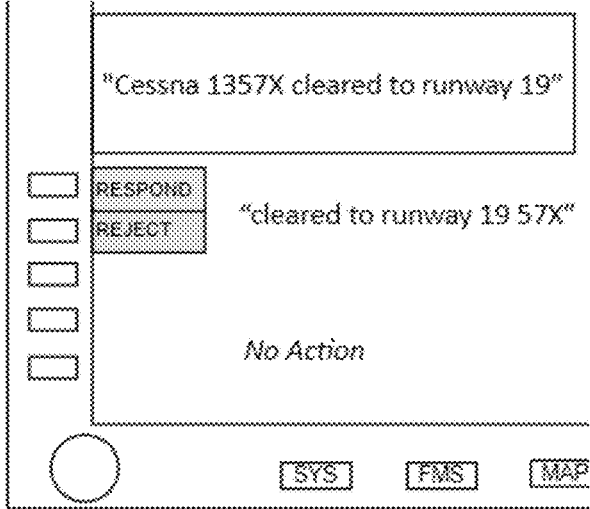
Figure 10D:
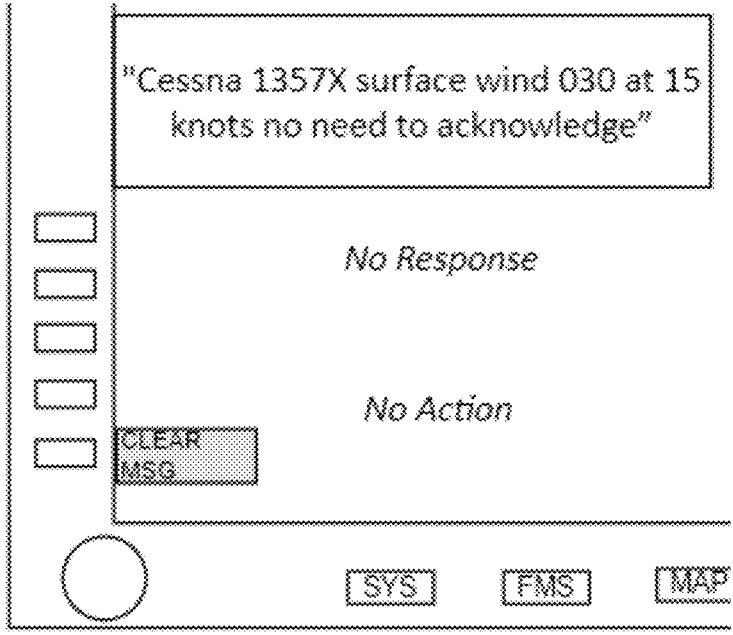

In some cases, the system may not have/receive a proposed action or response. In such cases, only the interpreted ATC message may be displayed. An example of a first case where only a proposed response is provided is illustrated in FIG. 10C. An example of a second case where there is no proposed response or action is illustrated in FIG. 10D.

Figure 10E:
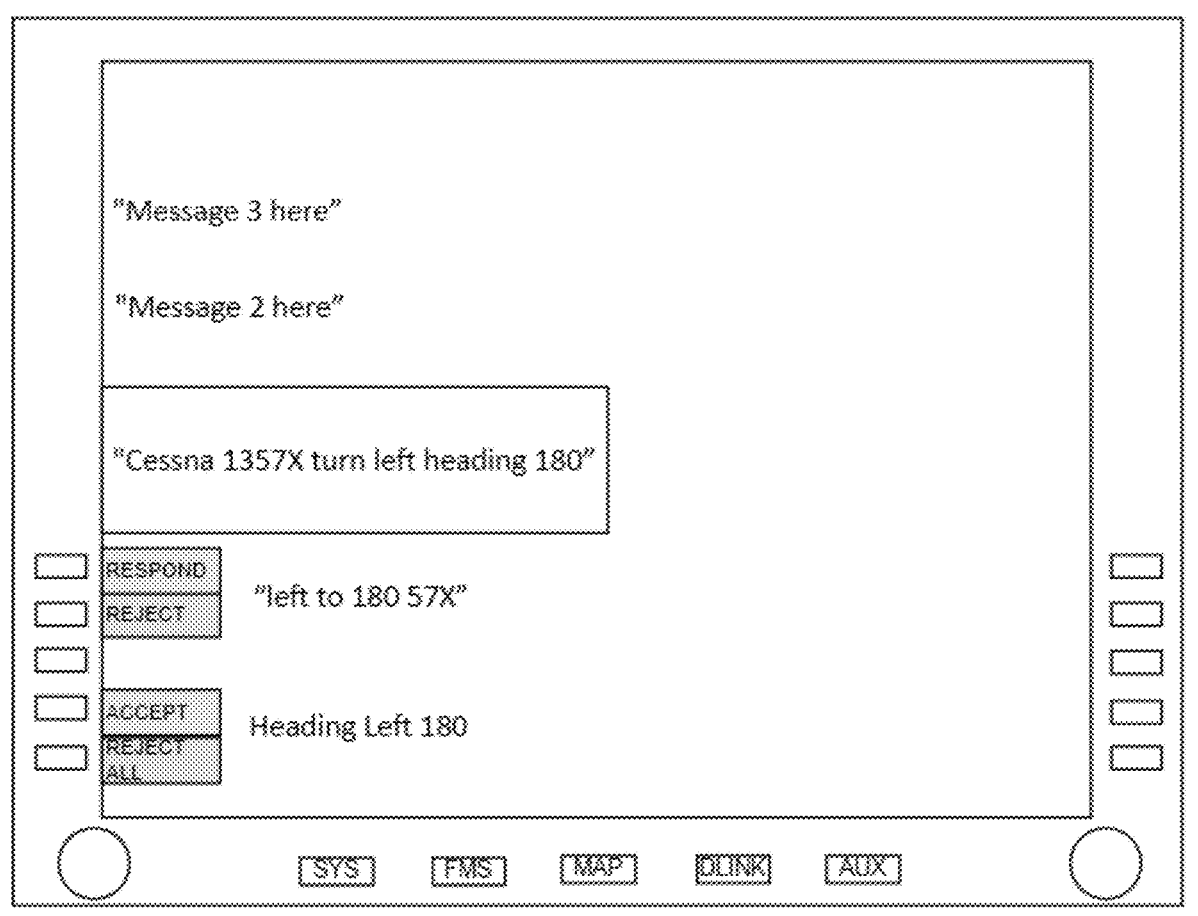

In some instances, there can be multiple messages from ATC before a response is generated/provided. For example, ATC can make a correction to a previous message. In example, new messages can be previewed on the Automated Communication page on the MFD, an example of which is shown in FIG. 10E. The pilot can accept/reject the current message, and then the next message may be displayed with the accept/reject options. Additionally or alternatively, the system can optionally differentiate between a unique new message and a repeat, corrected message. In such cases, may optionally remove the incorrect message and replace it with the correct one (e.g., manually entering a replacement message)

The pilot may also choose to ignore the message screen instead of rejecting the message. To prevent message queuing from filling, ignored messages can be cleared after a set time of inactivity (e.g., 30 seconds, 1 minute, 2 minutes, etc.). For example, a pilot may ignore one or more messages (such as in the instance that the aircraft is not the intended recipient). However, ignoring messages may ultimately decrease an attentiveness score (and/or be associated with a lower degree of attentiveness/higher degree of inattentiveness), which may ultimately trigger pilot attention checks or other aircraft responses after a prolonged period of pilot inactivity or lack of message acknowledgement.

In variants, the Automated communication functions can be enabled by a switch activated through the MFD. The Automated Communication Computer (ACC) can host natural language processing (NLP) and synthetic voice generation functions and can be connected to the audio panel through an enable switch. As an example, the switch can send a discrete signal to/via the FCC so the FCC receives the ACC state (e.g., and then the FCC can send a discrete signal to the switch). If the system malfunctions, the PIC may have the option to disconnect the ACC from the radios. Accordingly, any system failures can be localized and/or may not interfere with the pilot's communication.

Upon powerup, the ACC can receive the aircraft tail number (and/or additional aircraft identification parameter [s]) from the FCC.

The automated communication function may utilize flight plan information to assist interpretation of messages such as determining nearby waypoints. At the start of a flight, the FMS can send the flight plan and surrounding (and/or regional) navigational database information to the ACC. This information can include one or more of: flight plan, surrounding waypoints along the route, arrival and departure airports, SIDS, STARS, runways, and/or any other suitable information. If there is a change to the flight plan during the flight, the updated information will need to be sent to the ACC.

5.1 ATC Interface and Interpretation

In one set of variants, an example of which is shown in FIGURE n, a process flow for the ATC interface can include a three-part sequence (Part I, Part II, and Part III).

First (Part I), ATC Audio is provided to the ACC through the Audio Panel. Contemporaneously/concurrently, the PIC can listen to the ATC communication. The NLP function listens to ATC messages intended for the aircraft, by specifically listening for the aircraft tail number and/or identifier. The NLP function can then convert messages to text, parse the commands, and generate a response in text.

Second (Part II), the Core (a.k.a. Flight Control Computer, FCC) periodically requests the ACC for new messages. When the ACC receives a request from the Core and has a message in the queue, it will send the message to the Core. Each message may include the ATC text, the proposed response text, the commands, and/or any other suitable information. The Core can perform Cyclic Redundancy Check(s) (CRC) on the data, checks for stale data, performs range and logical checks on the commands (i.e., checking that a command has both a direction and value and checking the data is in the expected format), and/or any other suitable functionality.

If the ACC messages fail, the Core can request a message to be resent. If it fails multiple times, the Core can request the ACC to clear its queue. At this point, the ACC may need to be declared failed and the MFD can display that the Auto Communication Function is failed.

Third (Part III), the Core can provide (e.g., transmit/communicate) the ATC text, the proposed response text, the proposed action, and/or any other suitable information to the MFD to be displayed to the pilot. The ATC text can be displayed to give the pilot a one-to-one comparison to the audio heard in step 1. This may help the pilot validate the proposed response and proposed action which may also be displayed.

However, the ATC interface can otherwise operate.

5.2 ATC Response and Validation

In one set of variants, an example of which is shown in FIGURE n, a process flow for the ATC response (and/or validation) can include a three step sequence (Step I, Step II, and Step III).

First (Step I), The PIC can observe the ATC message, proposed response, proposed flight changes on the MFD, and/or any other suitable information. The PIC can accept the response, which can validate that the NLP function has correctly generated a text response. (The PIC will also have to validate the audio that is generated as described in step 3.) The acceptance can be passed through the core to the ACC.

If the PIC rejects the proposed response, the MFD can send the reject(ion) feedback through the Core to the ACC. The PIC can then respond to ATC.

Second (Step II), The ACC can generate the audio response, activate the PTT, send the audio through the audio panel/radios, and/or can perform any other suitable functionalities.

If rejected, the ACC may not send any audio response. (As an example, the ACC can record all feedback, including accept and/or reject.)

Third (Step III), As the audio can be sent out by the ACC, and the PIC can validate the generated audio by listening to the response.

If the audio message is incorrect, the PIC can take action to correct the transcription. If audio messages can be determined to be often incorrect or the system responds without acceptance from the PIC, the PIC can have the option to disable the automated communication. Alternatively, in some variants, the switch may provide an all or nothing approach. For example, if disabled, all functions related to auto communications may be disabled, not just the response generation.

However, the ATC response and/or validation can be otherwise configured.

5.3 ATC Command Validation

In one set of variants a process flow for ATC command validation (and/or implementation) can include a multi-element sequence (Element A, Element B, and Element C).

First (Element A), after a response is made to ATC, the PIC can accept the proposed flight changes. The validated changes can be sent to the Core. If rejected, the rejected feedback can be sent to the Core (e.g., and no automated flight changes may occur). The Feedback can also be sent to the ACC for recording. In some examples, the pilot may optionally provide a correct response (e.g., assigning a new heading or altitude, etc.) and/or may retain the ability to enter flight changes via the FMS/flight control panel.

Second (Element B), the Core can determine if the changes apply to the FMS or AFCS; and can also determine if the changes are compatible with the given state of the aircraft. In cases where the changes apply to the AFCS, the Core can update the AFCS and the updates can be displayed on the PFD via updated AFCS modes and/or targets. In some variants, if changes are not able to be made, the system can alert the pilot through the MFD.

Third (Element C), the PIC can observe the changes on the PFD and/or monitor the correct changes implemented through the AFCS.

However, the ATC commands can be otherwise and/or implemented.

Alternative embodiments implement the above methods and/or processing modules in non-transitory computer-readable media, storing computer-readable instructions. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A method for command of an aircraft comprising:
collecting sensor data with an aircraft sensor suite;
determining pilot monitoring data using a set of sensors within a cockpit of the aircraft;
at a computing system onboard the aircraft, autonomously generating an aircraft command based on the sensor data; and
controlling the aircraft based on the aircraft command, comprising:
determining a pilot attention state based on the pilot monitoring data, the pilot attention state indicating that a pilot is inattentive;
based on the pilot attention state, soliciting aircraft command validation from the pilot at a validation interface;
receiving an aircraft command validation via a pilot input at the validation interface;

in response to receiving the pilot input, determining that the pilot is attentive;
in response to the determination that the pilot is attentive, validating the aircraft command; and
in response to validation of the aircraft command, executing the aircraft command.

2. The method of claim 1, wherein the pilot monitoring data comprises data from multimodal pilot interactions with aircraft controls systems, wherein determining the pilot attention state comprises estimating an attentiveness score based on the multimodal pilot interactions, wherein soliciting the aircraft command validation is performed, using the validation interface, based on the attentiveness score satisfying a predetermined threshold.

3. The method of claim 2, wherein determining the pilot monitoring data comprises:
collecting a set of data with the set of sensors within the cockpit; and
extracting a set of features from the set of data, the set of features characterizing pilot interactions with the aircraft, wherein the attention score is estimated based on the set of features.

4. The method of claim 2, wherein the attentiveness score is estimated at least in part using a neural network model which is pretrained based on historical pilot monitoring data.

5. The method of claim 4, wherein the historical pilot monitoring data comprises historical pilot communications via an air traffic control (ATC) radio and historical interactions via the pilot validation interface.

6. The method of claim 1, wherein determining the pilot monitoring data comprises:
collecting a set of data with the set of sensors within the cockpit; and
extracting a set of features from the set of data, the set of features characterizing multimodal pilot interactions with the aircraft, wherein the pilot attention state is determined based on the set of features.

7. The method of claim 6, wherein the set of features characterizes aural comprehension comprising responsiveness of the pilot to an audio command, reading comprehension comprising responsiveness of the pilot to a text-based command, speech quality, grammatical clarity, and haptic responsiveness comprising responsiveness of the pilot to a haptic alert.

8. The method of claim 6, wherein the second set of features comprises: a semantic query response time and a semantic query response accuracy.

9. The method of claim 6, wherein the set of data comprises a set of state parameters, wherein the pilot attention state is determined using both the set of features and the set of state parameters.

10. The method of claim 1, wherein the set of sensors within the cockpit comprises an air traffic control (ATC) radio, wherein the set of pilot monitoring data comprises a speech slur score, wherein determining the pilot monitoring data comprises estimating the speech slur score by natural language processing (NLP) of pilot communication via the ATC radio.

11. The method of claim 1, wherein determining pilot monitoring data comprises:
responsive to satisfaction of a trigger condition, providing a pilot stimulus at the validation interface; and
evaluating a pilot response to the pilot stimulus using the set of sensors within the cockpit, wherein the set of sensors comprises an input mechanism at the validation interface.

12. The method of claim 11, wherein the trigger condition comprises an elapsed time period without a pilot validation input at the input mechanism, wherein the pilot validation input comprises a pilot interaction with an aircraft controls system.

13. The method of claim 11, wherein the trigger condition is a missed radiofrequency channel transition associated with a frequency change instruction received via an air traffic control (ATC) radio.

14. The method of claim 11, wherein the trigger condition comprises a request from a ground station.

15. The method of claim 1, wherein the set of sensors within the cockpit comprises a microphone which is communicatively coupled to a remote operator station, wherein determining the pilot attention state is based on inputs from a remote operator at the remote operator station.

16. The method of claim 15, wherein validating the aircraft command comprises: receiving validation from the pilot at the validation interface of the aircraft; and receiving validation from the remote operator station.

17. The method of claim 1, wherein validating the aircraft command based on the pilot attention state comprises:

transferring Pilot in Command (PIC) authority to a remote PIC; and notifying an onboard pilot of PIC authority transferal.

18. The method of claim 1, further comprising:

at the computing system, autonomously generating a second aircraft command based on the sensor data;

automatically validating the second aircraft command in response to satisfaction of a default authentication condition; and facilitating autonomous execution of the second aircraft command in response to validation of the second aircraft command.

19. The method of claim 18, wherein the default authentication condition comprises satisfaction of a time threshold corresponding to an urgency advisory.

20. The method of claim 18, further comprising: prior to facilitating autonomous execution of the second aircraft command: providing a text description of the second aircraft command via the validation interface.

21. A method for an aircraft, comprising:

collecting sensor data with an aircraft sensor suite;

determining pilot monitoring data using a set of sensors within a cockpit of the aircraft;

at a computing system, autonomously generating an aircraft command based on the sensor data;

determining a pilot attention state based on the pilot monitoring data, the attention state indicating that a pilot is inattentive;

responsive to the determination of the pilot attention state, validating the aircraft command, wherein validating the aircraft command comprises:

receiving validation from the pilot at the validation interface; and receiving validation from a remote operator at a remote operator station communicatively coupled to the validation interface; and in response to validation of the aircraft command, executing the aircraft command.

* * * * *